(12) United States Patent
Marotta

(10) Patent No.: US 12,478,714 B2
(45) Date of Patent: Nov. 25, 2025

(54) DIALYSIS CASSETTE WITH PUMP FEATURES

(71) Applicant: Bellco S.r.I., Mirandola (IT)

(72) Inventor: Gaspare Marotta, Mirandola (IT)

(73) Assignee: Bellco S.r.l, Mirandola (IT)

( * ) Notice: Subject to any disclaimer, the term of this patent is extended or adjusted under 35 U.S.C. 154(b) by 1044 days.

(21) Appl. No.: 17/511,860

(22) Filed: Oct. 27, 2021

(65) Prior Publication Data
US 2022/0134086 A1 May 5, 2022

(30) Foreign Application Priority Data

Oct. 30, 2020 (EP) ..................................... 20204904

(51) Int. Cl.
| | | |
|---|---|---|
| *A61M 60/847* | (2021.01) | |
| *A61M 1/14* | (2006.01) | |
| *A61M 1/28* | (2006.01) | |
| *A61M 60/113* | (2021.01) | |
| *A61M 60/216* | (2021.01) | |
| *A61M 60/37* | (2021.01) | |
| *A61M 60/816* | (2021.01) | |
| *A61M 60/851* | (2021.01) | |

(52) U.S. Cl.
CPC ............ *A61M 1/155* (2022.05); *A61M 1/154* (2022.05); *A61M 1/1565* (2022.05); *A61M 1/159* (2022.05); *A61M 1/28* (2013.01); *A61M 1/284* (2014.02); *A61M 1/287* (2013.01); *A61M 60/113* (2021.01); *A61M 60/216* (2021.01); *A61M 60/37* (2021.01); *A61M 60/816* (2021.01); *A61M 60/847* (2021.01); *A61M 60/851* (2021.01); *A61M 2205/0216* (2013.01); *A61M 2205/12* (2013.01); *A61M 2205/128* (2013.01); *A61M 2205/3331* (2013.01); *A61M 2205/3368* (2013.01)

(58) Field of Classification Search
CPC .... A61M 1/154; A61M 1/155; A61M 1/1565; A61M 1/159; A61M 1/28; A61M 1/284; A61M 1/287; A61M 60/113; A61M 60/216; A61M 60/37; A61M 60/816; A61M 60/851; A61M 60/847; A61M 2205/0216; A61M 2205/12; A61M 2205/128; A61M 2205/3331; A61M 2205/3368
See application file for complete search history.

(56) References Cited

U.S. PATENT DOCUMENTS

| | | |
|---|---|---|
| 5,951,870 A | 9/1999 | Utterberg |
| 6,044,691 A | 4/2000 | Kenley et al. |
| 6,066,261 A | 5/2000 | Spickermann |
| 6,077,443 A | 6/2000 | Goldau |
| 6,106,776 A | 8/2000 | Borovetz et al. |

(Continued)

OTHER PUBLICATIONS

Extended European Search Report dated Aug. 16, 2021 issued in corresponding EP Appln. No. 20204904.5.

*Primary Examiner* — John Kim

(57) ABSTRACT

A dialysis cassette includes a cassette housing having a plurality of channels fluidly coupled to a plurality of connectors and a plurality of valves disposed within the plurality of channels. The dialysis cassette also includes a pump assembly disposed within the cassette housing. The pump assembly includes a pump housing and a flexible rotor having a plurality of flexible vanes, where the flexible rotor is rotatable in either a clockwise direction or a counterclockwise direction to move a fluid through the plurality of channels.

20 Claims, 11 Drawing Sheets

(56) References Cited

U.S. PATENT DOCUMENTS

| | | |
|---|---|---|
| 6,114,466 A | 9/2000 | Davankov et al. |
| 6,126,831 A | 10/2000 | Goldau et al. |
| 6,133,393 A | 10/2000 | Davankov et al. |
| 6,138,517 A | 10/2000 | Laursen et al. |
| 6,159,377 A | 12/2000 | Davankov et al. |
| 6,200,289 B1 | 3/2001 | Hochman et al. |
| 6,217,826 B1 | 4/2001 | Reeder et al. |
| 6,221,040 B1 | 4/2001 | Kleinekofort |
| 6,228,262 B1 | 5/2001 | Shin et al. |
| 6,241,945 B1 | 6/2001 | Owen |
| 6,248,087 B1 | 6/2001 | Spears et al. |
| 6,306,346 B1 | 10/2001 | Lindsay |
| 6,325,774 B1 | 12/2001 | Bene et al. |
| 6,344,139 B1 | 2/2002 | Utterberg |
| 6,348,152 B1 | 2/2002 | Kawahara et al. |
| 6,387,324 B1 | 5/2002 | Patterson et al. |
| 6,395,180 B2 | 5/2002 | Chioini et al. |
| 6,409,024 B1 | 6/2002 | Nakashima et al. |
| 6,432,309 B1 | 8/2002 | Fuke et al. |
| 6,468,427 B1 | 10/2002 | Frey |
| 6,500,151 B1 | 12/2002 | Cobb et al. |
| 6,503,451 B2 | 1/2003 | Ikeda et al. |
| 6,519,569 B1 | 2/2003 | White et al. |
| 6,526,357 B1 | 2/2003 | Soussan et al. |
| 6,537,240 B2 | 3/2003 | Cavicchioli et al. |
| 6,555,059 B1 | 4/2003 | Myrick et al. |
| 6,572,576 B2 | 6/2003 | Brugger et al. |
| 6,576,191 B1 | 6/2003 | Myrick et al. |
| 6,582,387 B2 | 6/2003 | Derek et al. |
| 6,582,811 B1 | 6/2003 | Davankov et al. |
| 6,585,675 B1 | 7/2003 | O'Mahony et al. |
| 6,592,551 B1 | 7/2003 | Cobb |
| 6,595,942 B2 | 7/2003 | Kleinekofort |
| 6,601,432 B1 | 8/2003 | Ericson et al. |
| 6,602,424 B1 | 8/2003 | Kramer et al. |
| 6,602,468 B2 | 8/2003 | Patterson et al. |
| 6,605,218 B2 | 8/2003 | Kozawa et al. |
| 6,607,697 B1 | 8/2003 | Muller |
| 6,613,280 B2 | 9/2003 | Myrick et al. |
| 6,622,542 B2 | 9/2003 | Derek et al. |
| 6,623,443 B1 | 9/2003 | Polaschegg |
| 6,626,355 B2 | 9/2003 | Sasse et al. |
| 6,627,164 B1 | 9/2003 | Wong |
| 6,632,359 B1 | 10/2003 | Uezumi et al. |
| 6,638,710 B2 | 10/2003 | Leinenbach et al. |
| 6,640,611 B2 | 11/2003 | Ericson et al. |
| 6,648,845 B1 | 11/2003 | Gotch et al. |
| 6,653,841 B1 | 11/2003 | Koerdt et al. |
| 6,673,314 B1 | 1/2004 | Burbank et al. |
| 6,676,621 B1 | 1/2004 | Menninger |
| 6,682,698 B2 | 1/2004 | Chambers et al. |
| 6,685,450 B2 | 2/2004 | Bandis et al. |
| 6,689,083 B1 | 2/2004 | Gelfand et al. |
| 6,691,040 B2 | 2/2004 | Bosetto et al. |
| 6,691,047 B1 | 2/2004 | Fredericks |
| 6,712,978 B2 | 3/2004 | Leinenbach et al. |
| 6,723,284 B1 | 4/2004 | Reeder et al. |
| 6,726,647 B1 | 4/2004 | Sternby et al. |
| 6,730,266 B2 | 5/2004 | Matson et al. |
| 6,738,052 B1 | 5/2004 | Manke et al. |
| 6,759,008 B1 | 7/2004 | Patterson et al. |
| 6,767,333 B1 | 7/2004 | Muller et al. |
| 6,773,412 B2 | 8/2004 | O'Mahony et al. |
| 6,775,577 B2 | 8/2004 | Crnkovich et al. |
| 6,786,885 B2 | 9/2004 | Hochman et al. |
| 6,796,955 B2 | 9/2004 | O'Mahony et al. |
| 6,804,991 B2 | 10/2004 | Balschat et al. |
| 6,811,707 B2 | 11/2004 | Rovatti et al. |
| 6,811,750 B2 | 11/2004 | Patterson et al. |
| 6,818,196 B2 | 11/2004 | Wong |
| 6,821,432 B2 | 11/2004 | Metzner |
| 6,830,693 B2 | 12/2004 | Govoni et al. |
| 6,843,099 B2 | 1/2005 | Derek et al. |
| 6,846,161 B2 | 1/2005 | Kline et al. |
| 6,849,235 B2 | 2/2005 | Myrick et al. |
| 6,854,620 B2 | 2/2005 | Ramey |
| 6,855,291 B2 | 2/2005 | Patterson et al. |
| 6,860,866 B1 | 3/2005 | Graf et al. |
| 6,861,266 B1 | 3/2005 | Sternby |
| 6,868,309 B1 | 3/2005 | Begelman |
| 6,877,713 B1 | 4/2005 | Gray et al. |
| 6,880,034 B2 | 4/2005 | Manke et al. |
| 6,881,344 B2 | 4/2005 | Vasta et al. |
| 6,887,216 B2 | 5/2005 | Hochman et al. |
| 6,890,315 B1 | 5/2005 | Levin et al. |
| 6,890,482 B2 | 5/2005 | Divino, Jr. et al. |
| 6,899,847 B2 | 5/2005 | Myrick et al. |
| 6,908,546 B2 | 6/2005 | Smith |
| 6,917,828 B2 | 7/2005 | Fukuda |
| 6,923,782 B2 | 8/2005 | O'Mahony et al. |
| 6,929,619 B2 | 8/2005 | Fago et al. |
| 6,929,751 B2 | 8/2005 | Bowman, Jr. et al. |
| 6,935,560 B2 | 8/2005 | Andreasson et al. |
| 6,936,221 B1 | 8/2005 | Divino, Jr. et al. |
| 6,936,222 B2 | 8/2005 | Mortensen et al. |
| 6,939,111 B2 | 9/2005 | Huitt et al. |
| 6,939,468 B2 | 9/2005 | Wang et al. |
| 6,945,954 B2 | 9/2005 | Hochman et al. |
| 6,949,214 B2 | 9/2005 | Frey |
| 6,952,963 B2 | 10/2005 | Delnevo |
| 6,960,328 B2 | 11/2005 | Bortun et al. |
| 6,966,979 B2 | 11/2005 | Pedrazzi |
| 6,994,811 B2 | 2/2006 | Kools |
| 7,001,353 B2 | 2/2006 | Bosetto et al. |
| 7,004,924 B1 | 2/2006 | Brugger et al. |
| 7,011,761 B2 | 3/2006 | Muller |
| 7,013,727 B2 | 3/2006 | Delnevo |
| 7,014,765 B2 | 3/2006 | Dannenmaier |
| 7,022,284 B2 | 4/2006 | Brian et al. |
| 7,025,226 B2 | 4/2006 | Ramey |
| 7,033,498 B2 | 4/2006 | Wong |
| 7,033,539 B2 | 4/2006 | Krensky et al. |
| 7,072,710 B2 | 7/2006 | Chamney |
| 7,077,819 B1 | 7/2006 | Goldau et al. |
| 7,077,956 B2 | 7/2006 | Rovatti |
| 7,087,033 B2 | 8/2006 | Brugger et al. |
| 7,087,168 B2 | 8/2006 | Oishi et al. |
| 7,087,269 B2 | 8/2006 | Lee et al. |
| 7,097,630 B2 | 8/2006 | Gotch et al. |
| 7,125,493 B2 | 10/2006 | Wang et al. |
| 7,131,956 B1 | 11/2006 | Pirazzoli et al. |
| 7,131,957 B2 | 11/2006 | Muller et al. |
| 7,135,156 B2 | 11/2006 | Hai et al. |
| 7,140,542 B2 | 11/2006 | Andreasson et al. |
| 7,147,616 B2 | 12/2006 | Pedrazzi et al. |
| 7,153,285 B2 | 12/2006 | Lauman et al. |
| 7,154,378 B1 | 12/2006 | Ertas et al. |
| 7,166,084 B2 | 1/2007 | Utterberg |
| 7,169,352 B1 | 1/2007 | Felt et al. |
| 7,170,591 B2 | 1/2007 | Ohishi et al. |
| 7,172,569 B2 | 2/2007 | Kleinekofort |
| 7,172,570 B2 | 2/2007 | Cavalcanti et al. |
| 7,175,081 B2 | 2/2007 | Andreasson et al. |
| 7,175,809 B2 | 2/2007 | Gelfand et al. |
| 7,182,256 B2 | 2/2007 | Andreasson et al. |
| 7,186,342 B2 | 3/2007 | Pirazzoli et al. |
| 7,186,420 B2 | 3/2007 | Chang et al. |
| 7,186,966 B2 | 3/2007 | Al-Ali |
| 7,232,424 B2 | 6/2007 | Boyne-Aitken |
| 7,241,272 B2 | 7/2007 | Karoor et al. |
| 7,252,767 B2 | 8/2007 | Bortun et al. |
| 7,258,914 B2 | 8/2007 | Morikawa et al. |
| 7,299,981 B2 | 11/2007 | Hickle et al. |
| 7,303,540 B2 | 12/2007 | O'Mahony et al. |
| 7,311,689 B2 | 12/2007 | Levin et al. |
| 7,341,568 B2 | 3/2008 | Zhang |
| 7,347,837 B2 | 3/2008 | Azzolini |
| 7,381,195 B2 | 6/2008 | Mori et al. |
| 7,393,337 B2 | 7/2008 | Tonelli et al. |
| 7,399,289 B2 | 7/2008 | Gelfand et al. |
| 7,420,660 B2 | 9/2008 | Muller |
| 7,422,570 B2 | 9/2008 | Gerlach et al. |
| 7,442,302 B2 | 10/2008 | Mabuchi et al. |
| 7,462,161 B2 | 12/2008 | O'Mahony et al. |

(56) References Cited

U.S. PATENT DOCUMENTS

| | | |
|---|---|---|
| 7,488,447 B2 | 2/2009 | Sternby |
| 7,494,590 B2 | 2/2009 | Felding et al. |
| 7,540,851 B2 | 6/2009 | O'Mahony et al. |
| 7,563,240 B2 | 7/2009 | Gross et al. |
| 7,563,376 B2 | 7/2009 | Oishi |
| 7,566,432 B2 | 7/2009 | Wong |
| 7,575,562 B2 | 8/2009 | Oishi et al. |
| 7,585,286 B2 | 9/2009 | O'Mahony et al. |
| 7,592,184 B2 | 9/2009 | Khalil et al. |
| 7,608,060 B2 | 10/2009 | Gillespie, Jr. et al. |
| 7,615,158 B2 | 11/2009 | Sternby et al. |
| 7,622,043 B2 | 11/2009 | Sawada et al. |
| 7,635,349 B2 | 12/2009 | Tribe et al. |
| 7,638,052 B2 | 12/2009 | Mabuchi et al. |
| 7,639,136 B1 | 12/2009 | Wass et al. |
| 7,648,474 B2 | 1/2010 | Paolini et al. |
| 7,648,476 B2 | 1/2010 | Bock et al. |
| 7,648,477 B2 | 1/2010 | Vinci et al. |
| 7,661,293 B2 | 2/2010 | Dam |
| 7,694,565 B2 | 4/2010 | Koerdt et al. |
| 7,699,992 B2 | 4/2010 | Sternby |
| 7,731,689 B2 | 6/2010 | Prisco et al. |
| 7,736,507 B2 | 6/2010 | Wong |
| 7,748,275 B2 | 7/2010 | Kouda et al. |
| 7,749,184 B2 | 7/2010 | Cavalcanti et al. |
| 7,749,435 B2 | 7/2010 | Ogihara et al. |
| 7,751,043 B2 | 7/2010 | Scarpaci et al. |
| 7,758,532 B2 | 7/2010 | Mori et al. |
| 7,766,863 B2 | 8/2010 | Gillespie, Jr. et al. |
| 7,771,379 B2 | 8/2010 | Treu |
| 7,776,219 B2 | 8/2010 | Brugger et al. |
| 7,780,618 B2 | 8/2010 | Felt et al. |
| 7,790,113 B2 | 9/2010 | Putnam et al. |
| 7,794,419 B2 | 9/2010 | Paolini et al. |
| 7,815,809 B2 | 10/2010 | Jansson et al. |
| 7,823,287 B2 | 11/2010 | Gerlach et al. |
| 7,824,354 B2 | 11/2010 | Vinci et al. |
| 7,837,042 B2 | 11/2010 | Yokota et al. |
| 7,854,726 B2 | 12/2010 | Fago et al. |
| 7,857,976 B2 | 12/2010 | Bissler et al. |
| 7,862,530 B2 | 1/2011 | Callan et al. |
| 7,878,783 B2 | 2/2011 | Kunz |
| 7,896,842 B2 | 3/2011 | Palmroos et al. |
| 7,905,853 B2 | 3/2011 | Chapman et al. |
| 7,905,855 B2 | 3/2011 | Childers |
| 7,906,093 B2 | 3/2011 | Wong |
| 7,911,353 B2 | 3/2011 | Bedingfield |
| 7,922,007 B2 | 4/2011 | Mabuchi et al. |
| 7,922,899 B2 | 4/2011 | Vasta et al. |
| 7,935,071 B2 | 5/2011 | Levin et al. |
| 7,935,072 B2 | 5/2011 | Tonelli et al. |
| 7,938,792 B2 | 5/2011 | Roger et al. |
| 7,938,967 B2 | 5/2011 | Folden et al. |
| 7,955,289 B2 | 6/2011 | O'Mahony et al. |
| 7,955,291 B2 | 6/2011 | Sternby |
| 7,959,196 B2 | 6/2011 | Dale |
| 7,959,808 B2 | 6/2011 | Yeager et al. |
| 7,981,280 B2 | 7/2011 | Carr et al. |
| 7,985,196 B2 | 7/2011 | Kopperschmidt et al. |
| 7,988,768 B2 | 8/2011 | Yardimci et al. |
| 7,988,854 B2 | 8/2011 | Tsukamoto |
| 7,990,272 B2 | 8/2011 | Wass et al. |
| 7,993,297 B2 | 8/2011 | Vinci et al. |
| 8,012,114 B2 | 9/2011 | Daniel et al. |
| 8,034,161 B2 | 10/2011 | Gura et al. |
| 8,035,517 B2 | 10/2011 | Gibson |
| 8,038,886 B2 | 10/2011 | Folden et al. |
| 8,043,076 B2 | 10/2011 | Kopperschmidt |
| 8,051,991 B2 | 11/2011 | Krause et al. |
| 8,066,658 B2 | 11/2011 | Karoor et al. |
| 8,070,707 B2 | 12/2011 | Gelfand et al. |
| 8,075,509 B2 | 12/2011 | Molducci et al. |
| 8,078,333 B2 | 12/2011 | Kienman et al. |
| 8,080,161 B2 | 12/2011 | Ding et al. |
| 8,087,702 B2 | 1/2012 | Schmidt |
| 8,088,090 B2 | 1/2012 | Felt et al. |
| 8,091,407 B2 | 1/2012 | Schneider et al. |
| 8,095,390 B2 | 1/2012 | Bluemler et al. |
| 8,104,348 B2 | 1/2012 | Balschat et al. |
| 8,104,624 B2 | 1/2012 | Chidambaran et al. |
| 8,105,260 B2 | 1/2012 | Tonelli et al. |
| 8,111,159 B2 | 2/2012 | Andreasson et al. |
| 8,136,675 B2 | 3/2012 | Buck et al. |
| 8,137,553 B2 | 3/2012 | Fulkerson et al. |
| 8,140,274 B2 | 3/2012 | Gagel et al. |
| 8,178,040 B2 | 5/2012 | Brauer |
| 8,182,691 B2 | 5/2012 | Stahl |
| 8,197,432 B2 | 6/2012 | O'Mahony et al. |
| 8,197,745 B1 | 6/2012 | Buck et al. |
| 8,202,428 B2 | 6/2012 | Heilmann et al. |
| 8,202,503 B2 | 6/2012 | Putnam et al. |
| 8,210,049 B2 | 7/2012 | Brugger |
| 8,219,982 B2 | 7/2012 | Harkanyi et al. |
| 8,220,643 B2 | 7/2012 | Eisen |
| 8,240,636 B2 | 8/2012 | Smith |
| 8,246,564 B2 | 8/2012 | Myrick et al. |
| 8,287,736 B2 | 10/2012 | Roncadi et al. |
| 8,298,427 B2 | 10/2012 | Ficheux et al. |
| 8,314,740 B2 | 11/2012 | Blumberg, Jr. |
| 8,315,654 B2 | 11/2012 | Balschat et al. |
| 8,315,885 B2 | 11/2012 | Krogh et al. |
| 8,317,168 B2 | 11/2012 | Murakami |
| 8,317,499 B2 | 11/2012 | Bragimov |
| 8,317,738 B2 | 11/2012 | Shida et al. |
| 8,325,045 B2 | 12/2012 | Dattolo et al. |
| 8,328,749 B2 | 12/2012 | Murakami et al. |
| 8,333,724 B2 | 12/2012 | Barrett et al. |
| 8,343,085 B2 | 1/2013 | Toyoda et al. |
| 8,350,195 B2 | 1/2013 | Hedmann et al. |
| 8,353,870 B2 | 1/2013 | Levin et al. |
| 8,361,023 B2 | 1/2013 | Bedingfield |
| 8,394,046 B2 | 3/2013 | Nuernberger et al. |
| 8,394,321 B2 | 3/2013 | Franzoni et al. |
| 8,398,858 B2 | 3/2013 | Kashefi-Khorasani et al. |
| 8,400,298 B2 | 3/2013 | Rada |
| 8,409,445 B2 | 4/2013 | Levin et al. |
| 8,409,502 B2 | 4/2013 | Mortensen et al. |
| 8,409,864 B2 | 4/2013 | Ash |
| 8,425,767 B2 | 4/2013 | Fava et al. |
| 8,430,834 B2 | 4/2013 | Kopperschmidt |
| 8,432,547 B2 | 4/2013 | Scarpaci et al. |
| 8,449,487 B2 | 5/2013 | Hovland et al. |
| 8,459,543 B2 | 6/2013 | Devergne et al. |
| 8,465,446 B2 | 6/2013 | Chapman et al. |
| 8,480,609 B2 | 7/2013 | Fava et al. |
| 8,485,998 B2 | 7/2013 | Moll et al. |
| 8,486,021 B2 | 7/2013 | Hoshide et al. |
| 8,496,824 B2 | 7/2013 | Remkes et al. |
| 8,496,874 B2 | 7/2013 | Gellman et al. |
| 8,497,107 B2 | 7/2013 | Merchant |
| 8,512,271 B2 | 8/2013 | Moissl et al. |
| 8,512,554 B2 | 8/2013 | Yu et al. |
| 8,512,564 B2 | 8/2013 | Bene et al. |
| 8,518,247 B2 | 8/2013 | Akita et al. |
| 8,518,326 B2 | 8/2013 | Brady et al. |
| 8,529,491 B2 | 9/2013 | Beiriger |
| 8,539,573 B2 | 9/2013 | Newlin et al. |
| 8,545,425 B2 | 10/2013 | Lundtveit et al. |
| 8,558,964 B2 | 10/2013 | Bedingfield |
| 8,560,510 B2 | 10/2013 | Brueggerhoff et al. |
| 8,562,834 B2 | 10/2013 | Kamen et al. |
| 8,562,876 B2 | 10/2013 | Sternberg |
| 8,568,595 B2 | 10/2013 | Castellarnau |
| 8,574,309 B2 | 11/2013 | Galea et al. |
| 8,585,907 B2 | 11/2013 | Raiford et al. |
| 8,585,968 B2 | 11/2013 | Morley et al. |
| 8,596,467 B2 | 12/2013 | Krause et al. |
| 8,597,190 B2 | 12/2013 | Rule et al. |
| 8,597,227 B2 | 12/2013 | Childers et al. |
| 8,597,505 B2 | 12/2013 | Fulkerson et al. |
| 8,603,021 B2 | 12/2013 | Levin et al. |
| 8,608,658 B2 | 12/2013 | Burbank et al. |
| 8,609,022 B2 | 12/2013 | Nakao et al. |
| 8,610,577 B2 | 12/2013 | Blumberg, Jr. |

(56) References Cited

U.S. PATENT DOCUMENTS

| | | |
|---|---|---|
| 8,617,393 B2 | 12/2013 | Remkes et al. |
| 8,625,100 B2 | 1/2014 | Hanko |
| 8,640,887 B2 | 2/2014 | Wong |
| 8,641,615 B2 | 2/2014 | Burbank et al. |
| 8,641,655 B2 | 2/2014 | Rambod et al. |
| 8,647,410 B2 | 2/2014 | Borenstein et al. |
| 8,657,775 B2 | 2/2014 | Hutchison et al. |
| 8,663,372 B2 | 3/2014 | Romdhane et al. |
| 8,672,145 B2 | 3/2014 | Eisen |
| 8,679,348 B2 | 3/2014 | Burbank et al. |
| 8,684,927 B2 | 4/2014 | Basaglia |
| 8,685,320 B2 | 4/2014 | Ogihara et al. |
| 8,687,003 B2 | 4/2014 | Dalesch et al. |
| 8,733,559 B2 | 5/2014 | Wong |
| 8,741,147 B2 | 6/2014 | Bene et al. |
| 8,747,342 B2 | 6/2014 | Caleffi et al. |
| 8,747,742 B2 | 6/2014 | Kawamura et al. |
| 8,748,538 B2 | 6/2014 | Krause et al. |
| 8,764,981 B2 | 7/2014 | Ding et al. |
| 8,764,987 B2 | 7/2014 | Gross et al. |
| 8,769,625 B2 | 7/2014 | Wang et al. |
| 8,771,215 B2 | 7/2014 | Tonelli et al. |
| 8,771,516 B2 | 7/2014 | Krause et al. |
| 8,775,196 B2 | 7/2014 | Simpson et al. |
| 8,784,668 B2 | 7/2014 | Beiriger |
| 8,803,044 B2 | 8/2014 | Kienman et al. |
| 8,813,769 B2 | 8/2014 | Gastauer et al. |
| 8,814,830 B2 | 8/2014 | Morris et al. |
| 8,828,225 B2 | 9/2014 | Okafuji et al. |
| 8,836,519 B2 | 9/2014 | Wright et al. |
| 8,845,571 B2 | 9/2014 | Kotanko et al. |
| 8,858,486 B2 | 10/2014 | Zhang et al. |
| 8,858,792 B2 | 10/2014 | Ding et al. |
| 8,864,700 B2 | 10/2014 | Kawamura et al. |
| 8,870,812 B2 | 10/2014 | Alberti et al. |
| 8,881,600 B2 | 11/2014 | Puppini et al. |
| 8,881,915 B2 | 11/2014 | Yokota et al. |
| 8,882,696 B2 | 11/2014 | Tamari |
| 8,882,704 B2 | 11/2014 | Fago et al. |
| 8,883,066 B2 | 11/2014 | Shiki |
| 8,900,173 B2 | 12/2014 | Sugioka |
| 8,905,959 B2 | 12/2014 | Basaglia |
| 8,906,240 B2 | 12/2014 | Crnkovich et al. |
| 8,906,300 B2 | 12/2014 | Wang et al. |
| 8,911,629 B2 | 12/2014 | Tsukamoto |
| 8,924,458 B2 | 12/2014 | Levin et al. |
| 8,926,544 B2 | 1/2015 | Hogard |
| 8,937,553 B2 | 1/2015 | Fujioka et al. |
| 8,950,241 B2 | 2/2015 | Hedmann et al. |
| 8,992,777 B2 | 3/2015 | Doyle |
| 9,005,153 B2 | 4/2015 | Kopperschmidt et al. |
| 9,022,981 B2 | 5/2015 | Oesterreich et al. |
| 9,028,740 B2 | 5/2015 | Gohl et al. |
| 9,033,908 B2 | 5/2015 | Schilthuizen et al. |
| 9,050,411 B2 | 6/2015 | Kelly et al. |
| 9,072,830 B2 | 7/2015 | Kelly et al. |
| 9,072,831 B2 | 7/2015 | Kelly et al. |
| 9,072,843 B2 | 7/2015 | Kelly et al. |
| 9,080,985 B2 | 7/2015 | Stevenson et al. |
| 9,095,661 B2 | 8/2015 | Bene |
| 9,117,012 B2 | 8/2015 | Basaglia |
| 9,119,949 B2 | 9/2015 | Brandl et al. |
| 9,140,251 B2 | 9/2015 | Beiriger |
| 9,155,825 B2 | 10/2015 | Kelly et al. |
| 9,161,980 B2 | 10/2015 | Emnebrant et al. |
| 9,162,020 B2 | 10/2015 | Vantard et al. |
| 9,165,112 B2 | 10/2015 | Doyle et al. |
| 9,173,988 B2 | 11/2015 | Barrett et al. |
| 9,174,172 B2 | 11/2015 | Shiki |
| 9,178,891 B2 | 11/2015 | Wang et al. |
| 9,180,238 B2 | 11/2015 | Bedingfield et al. |
| 9,187,744 B2 | 11/2015 | Merchant |
| 9,189,597 B2 | 11/2015 | Bluemler et al. |
| 9,199,023 B2 | 12/2015 | Takeuchi |
| 9,199,024 B2 | 12/2015 | Sasaki et al. |
| 9,199,205 B2 | 12/2015 | Weber et al. |
| 9,203,143 B2 | 12/2015 | Blumberg, Jr. |
| 9,205,247 B2 | 12/2015 | Ueda et al. |
| 9,208,296 B1 | 12/2015 | Romanick |
| 9,211,369 B2 | 12/2015 | Gartner et al. |
| 9,212,988 B2 | 12/2015 | Akita et al. |
| 9,215,985 B2 | 12/2015 | Gross et al. |
| 9,216,246 B2 | 12/2015 | Kelly et al. |
| 9,220,827 B2 | 12/2015 | Meibaum et al. |
| 9,220,832 B2 | 12/2015 | Weaver et al. |
| 9,226,999 B2 | 1/2016 | Nakel et al. |
| 9,234,302 B2 | 1/2016 | Weber et al. |
| 9,242,035 B2 | 1/2016 | Karoor |
| 9,242,036 B2 | 1/2016 | Bluchel et al. |
| 9,243,625 B2 | 1/2016 | Brandl et al. |
| 9,243,991 B2 | 1/2016 | Wagner et al. |
| 9,250,216 B2 | 2/2016 | Wright et al. |
| 9,254,279 B2 | 2/2016 | Karoor et al. |
| 9,267,500 B2 | 2/2016 | Gronau et al. |
| 9,270,010 B2 | 2/2016 | Blumberg, Jr. |
| 9,272,127 B2 | 3/2016 | Rada et al. |
| 9,278,168 B2 | 3/2016 | Gellman et al. |
| 9,283,246 B2 | 3/2016 | Fenn et al. |
| 9,283,310 B2 | 3/2016 | Royer et al. |
| 9,289,545 B2 | 3/2016 | Olde et al. |
| 9,293,110 B2 | 3/2016 | Dolgos et al. |
| 9,295,394 B2 | 3/2016 | Kopperschmidt et al. |
| 9,295,778 B2 | 3/2016 | Kamen et al. |
| 9,296,611 B2 | 3/2016 | Wong |
| 9,302,037 B2 | 4/2016 | Wilt et al. |
| 9,308,308 B2 | 4/2016 | Ding et al. |
| 9,310,232 B2 | 4/2016 | Heide et al. |
| 9,311,448 B2 | 4/2016 | Gruendken et al. |
| 9,314,207 B2 | 4/2016 | Marterstock |
| 9,314,480 B2 | 4/2016 | Jansson et al. |
| 9,314,560 B2 | 4/2016 | Wiktor |
| 9,320,845 B2 | 4/2016 | Falkenhagen et al. |
| 9,345,827 B2 | 5/2016 | Hertz |
| 9,352,083 B2 | 5/2016 | Heitmeiter et al. |
| 9,352,139 B2 | 5/2016 | Reiter et al. |
| 9,352,283 B2 | 5/2016 | Ying et al. |
| 9,353,220 B2 | 5/2016 | Savariar et al. |
| 9,354,640 B2 | 5/2016 | Byler |
| 9,360,129 B2 | 6/2016 | Smith |
| 9,364,597 B2 | 6/2016 | Wolff et al. |
| 9,364,602 B2 | 6/2016 | Kelly et al. |
| 9,364,604 B2 | 6/2016 | Ferrarini et al. |
| 9,370,614 B2 | 6/2016 | Ahrens |
| 9,375,524 B2 | 6/2016 | Levin et al. |
| 9,383,288 B2 | 7/2016 | Solem et al. |
| 9,387,441 B2 | 7/2016 | Ding et al. |
| 9,399,092 B2 | 7/2016 | Christmann |
| 9,400,199 B2 | 7/2016 | Wolff |
| 9,402,941 B2 | 8/2016 | Rambod et al. |
| 9,402,945 B2 | 8/2016 | Hogard et al. |
| 9,402,987 B2 | 8/2016 | Kamen et al. |
| 9,404,825 B2 | 8/2016 | Katz et al. |
| 9,408,958 B2 | 8/2016 | Wang et al. |
| 9,415,201 B2 | 8/2016 | Marterstock |
| 9,427,513 B2 | 8/2016 | Holmer et al. |
| 9,427,518 B2 | 8/2016 | Brueckner |
| 9,433,356 B2 | 9/2016 | Olde et al. |
| 9,435,459 B2 | 9/2016 | Bedingfield |
| 9,436,802 B2 | 9/2016 | Romanick |
| 9,440,198 B2 | 9/2016 | McCloskey et al. |
| 9,442,036 B2 | 9/2016 | Furmanski et al. |
| 9,452,252 B2 | 9/2016 | Kopperschmidt |
| 9,463,202 B2 | 10/2016 | Jansson et al. |
| 9,463,266 B2 | 10/2016 | Noguchi et al. |
| 9,470,341 B2 | 10/2016 | Brehm et al. |
| 9,474,846 B2 | 10/2016 | Steger |
| 9,488,510 B2 | 11/2016 | Beavis et al. |
| 9,492,794 B2 | 11/2016 | Yokota et al. |
| 9,504,778 B2 | 11/2016 | Hopping et al. |
| 9,514,322 B2 | 12/2016 | Golshenas |
| 9,514,518 B2 | 12/2016 | Gillespie et al. |
| 9,517,296 B2 | 12/2016 | Fulkerson et al. |
| 9,518,958 B2 | 12/2016 | Wilt et al. |
| 9,527,040 B2 | 12/2016 | Krause et al. |

(56) References Cited

U.S. PATENT DOCUMENTS

| | | |
|---|---|---|
| 9,527,627 B2 | 12/2016 | Eyrard et al. |
| 9,542,578 B2 | 1/2017 | Pattolo et al. |
| 9,545,469 B2 | 1/2017 | Curtis et al. |
| 9,548,533 B2 | 1/2017 | Blumberg, Jr. |
| 9,550,021 B2 | 1/2017 | Beden et al. |
| 9,555,146 B2 | 1/2017 | Fehr et al. |
| 9,555,181 B2 | 1/2017 | Hedmann et al. |
| 9,568,432 B2 | 2/2017 | Baxi et al. |
| 9,582,645 B2 | 2/2017 | Yu et al. |
| 9,585,992 B2 | 3/2017 | Bene |
| 9,599,599 B2 | 3/2017 | Ash et al. |
| 9,612,182 B2 | 4/2017 | Olde et al. |
| 9,616,160 B2 | 4/2017 | Daniel |
| 9,616,161 B2 | 4/2017 | Jansson et al. |
| 9,616,163 B2 | 4/2017 | Wong et al. |
| 9,616,164 B2 | 4/2017 | Nuernberger |
| 9,616,393 B2 | 4/2017 | Hidaka et al. |
| 9,635,111 B2 | 4/2017 | Wang et al. |
| 9,636,447 B2 | 5/2017 | Olde et al. |
| 9,642,961 B2 | 5/2017 | Kelly et al. |
| 9,655,922 B1 | 5/2017 | Jansson et al. |
| 9,662,485 B2 | 5/2017 | Chung et al. |
| 9,675,743 B2 | 6/2017 | Raiford et al. |
| 9,675,745 B2 | 6/2017 | Kelly et al. |
| 9,682,184 B2 | 6/2017 | Wong |
| 9,703,926 B2 | 7/2017 | Dolgos et al. |
| 9,707,329 B2 | 7/2017 | Merchant et al. |
| 9,713,670 B2 | 7/2017 | Herrmann et al. |
| 9,724,455 B2 | 8/2017 | Kopperschmidt et al. |
| 9,742,065 B2 | 8/2017 | Blumberg, Jr. |
| 9,744,300 B2 | 8/2017 | Kamen et al. |
| 9,750,865 B2 | 9/2017 | Vasta et al. |
| 9,752,730 B2 | 9/2017 | Voelz |
| 9,757,503 B2 | 9/2017 | Haecker et al. |
| 9,770,546 B2 | 9/2017 | Vasta |
| 9,775,937 B2 | 10/2017 | Wang et al. |
| 9,776,143 B2 | 10/2017 | Krause et al. |
| 9,782,528 B2 | 10/2017 | Balschat et al. |
| 9,791,270 B2 | 10/2017 | Paolini et al. |
| 9,795,731 B2 | 10/2017 | Kelly et al. |
| 9,795,932 B2 | 10/2017 | Yokota et al. |
| 9,802,162 B2 | 10/2017 | Hildwein et al. |
| 9,806,399 B2 | 10/2017 | Blumberg, Jr. |
| 9,808,586 B2 | 11/2017 | Kogan |
| 9,821,102 B2 | 11/2017 | Jansson et al. |
| 9,821,106 B1 | 11/2017 | Vasta et al. |
| 9,821,107 B2 | 11/2017 | Weaver et al. |
| 9,833,556 B2 | 12/2017 | Olde et al. |
| 9,836,185 B2 | 12/2017 | O'Mahony et al. |
| 9,844,620 B2 | 12/2017 | Stuva et al. |
| 9,846,085 B2 | 12/2017 | Newell et al. |
| 9,849,228 B2 | 12/2017 | Noack et al. |
| 9,855,380 B2 | 1/2018 | Ritter et al. |
| 9,878,086 B2 | 1/2018 | Kleinekofort |
| 9,883,799 B2 | 2/2018 | Kotanko et al. |
| 9,889,244 B2 | 2/2018 | Arrizza et al. |
| 9,901,669 B2 | 2/2018 | Wolff et al. |
| 9,901,726 B2 | 2/2018 | Stenzel et al. |
| 9,907,898 B2 | 3/2018 | Hedmann et al. |
| 9,921,271 B2 | 3/2018 | Labarthe et al. |
| 9,925,155 B2 | 3/2018 | Forsback et al. |
| 9,925,320 B2 | 3/2018 | Childers et al. |
| 9,933,391 B2 | 4/2018 | Hollstein |
| 9,950,104 B2 | 4/2018 | Gronau et al. |
| 9,974,895 B2 | 5/2018 | Storr et al. |
| 9,987,411 B2 | 6/2018 | Planas et al. |
| 9,993,777 B2 | 6/2018 | Hayashi et al. |
| 10,002,190 B2 | 6/2018 | West |
| 10,022,484 B2 | 7/2018 | Brugger et al. |
| 10,024,442 B2 | 7/2018 | Maenz et al. |
| 10,044,791 B2 | 8/2018 | Kamen et al. |
| 10,057,997 B2 | 8/2018 | Schafer et al. |
| 10,058,692 B2 | 8/2018 | Geiger et al. |
| 10,080,996 B2 | 9/2018 | Berzinis et al. |
| 10,099,000 B2 | 10/2018 | Strohhoefer et al. |
| 10,101,316 B2 | 10/2018 | Wolff et al. |
| 10,130,749 B2 | 11/2018 | Schade |
| 10,149,938 B2 | 12/2018 | Murphy et al. |
| 10,172,990 B2 | 1/2019 | Stenzel et al. |
| 10,188,991 B2 | 1/2019 | Menda et al. |
| 10,203,273 B2 | 2/2019 | Burkert |
| 10,247,663 B2 | 4/2019 | Janik et al. |
| 10,300,187 B2 | 5/2019 | Lisitschew |
| 10,307,531 B2 | 6/2019 | Faulhaber et al. |
| 10,322,220 B2 | 6/2019 | Riemenschneider |
| 10,391,228 B2 | 8/2019 | Kelly et al. |
| 2005/0209563 A1 | 9/2005 | Hopping et al. |
| 2018/0010612 A1 | 1/2018 | Wegener et al. |

DIALYSIS CASSETTE WITH PUMP FEATURES

CROSS-REFERENCE TO RELATED APPLICATIONS

The present application claims the benefit of and priority to EP Application No. 20204904.5 filed on Oct. 30, 2020. The entire contents of the foregoing application is incorporated by reference herein.

BACKGROUND

Patients in need of dialysis may be treated using peritoneal dialysis (PD), hemodialysis, and hemofiltration treatments. Peritoneal dialysis (PD) is a dialysis treatment where a peritoneal dialysis fluid (i.e., dialysis solution) is cycled into and out of a peritoneal cavity to perform exchange across the peritoneum of the patient. Toxins and metabolic waste products are exchanged between the fluid injected into the peritoneum and the vascularized peritoneal membrane.

Hemodialysis and hemofiltration systems circulate blood and dialysis solution through a dialyzer having a filter membrane separating blood and dialysis solution. Toxins and metabolic waste products are exchanged through the dialyzer membrane between the dialysis solution and the blood circulating through the dialyzer.

These treatments are administered using PD and hemodialysis systems, which may include a controlled flow path for transporting fluids used during a therapy session. One or more of the following solutions may be supplied to the patient: a peritoneal dialysis fluid, a priming solution, a physiologically compatible solution for contacting blood, a physiologically compatible solution for infusion to a subject, a solution for blood rinse back to a subject, and the like.

PD systems include machines, which are also referred to as "cyclers", are designed to automatically infuse, dwell, and drain dialysis solution to and from the patient's peritoneal cavity in a process referred to as "continuous cycler-assisted peritoneal dialysis" (CCPD). The treatment typically lasts for several hours, often beginning with an initial drain procedure to empty the peritoneal cavity of used or spent dialysis solution. The sequence then proceeds through the succession of infusion, dwell, and drain phases that follow one after the other. Each phase is called a cycle.

Due to the length of the treatment, the large size of the PD machine and the large volume of dialysis solution required for the treatment, the treatment may be performed at home while the patient sleeps. Although nighttime CCPD treatments are sufficient for some patients, other patients require one or more additional fluid exchanges during the daytime. To permit the patient to participate in normal daily activities outside of the home, continuous ambulatory peritoneal dialysis (CAPD) is performed by connecting a bag of dialysis fluid to the patient's peritoneal catheter, and delivering about 1-3 liters of dialysis solution to the peritoneal cavity. After permitting the dialysis solution to dwell in the peritoneal cavity for a predetermined period of time, the dialysis solution is drained from the peritoneal cavity.

Since these fluids may be directly introduced into a human body and/or contacts blood through the membrane, the fluids are required to be free of biological and chemical contaminants. Thus, single use fluid lines and cassettes are used to minimize contamination during treatment. There is a need for novel cassettes configured to move large amounts of fluids efficiently.

SUMMARY

The present disclosure provides a fluid cassette for use with PD systems. In embodiments, certain features of the cassette may be incorporated into cassettes for use with hemodialysis systems and other systems used in blood treatment.

According to one embodiment of the present disclosure a dialysis cassette is disclosed. The dialysis cassette includes a cassette housing having a plurality of channels fluidly coupled to a plurality of connectors and a plurality of valves disposed within the plurality of channels. The dialysis cassette also includes a pump assembly disposed within the cassette housing. The pump assembly includes a pump housing and a flexible rotor having a plurality of flexible vanes, where the flexible rotor is rotatable in either a clockwise direction or a counterclockwise direction to move a fluid through the plurality of channels.

Implementations of the above embodiment may include one or more of the following features. The pump housing may include an inlet and an outlet coupled to the plurality of channels, and a narrowing portion disposed between the inlet and the outlet. The flexible vanes may be configured to compress when contacting the narrowing portion. The flexible rotor may include an elastomer and a thermoplastic polymer. The flexible rotor may be rotatable about a rotation axis perpendicular to a plane defined by the cassette housing. The pump housing may include a drive shaft and a gasket disposed about the drive shaft. The gasket may be configured to fluidly seal the pump housing. Each of the plurality of valves may be a pinch valve having an undulating shape with a deflectable portion. The cassette housing may further include one or more sensors disposed in fluid contact with the plurality of channels. The sensors may be a pressure sensor, a temperature sensor, a conductivity sensor, or an air bubble detector.

According to another embodiment of the present disclosure a dialysis system is disclosed. The dialysis system includes a peritoneal dialysis cycler having a cassette interface, a patient line, a drain line, and a fluid source. The dialysis system also includes a cassette configured to couple to the cassette interface, the patient line, the drain line, and the fluid source. The cassette includes a plurality of channels fluidly coupled to a plurality of connectors each of which is coupled to a respective one of the patient line, the drain line, and the fluid source. The cassette also includes a plurality of valves, each valve of the plurality of valves disposed within a respective channel of the plurality of channels. The cassette further includes a pump assembly disposed within the cassette housing. The pump assembly includes a pump housing and a flexible rotor including a plurality of flexible vanes, where the flexible rotor is rotatable in either a clockwise direction or a counterclockwise direction to move a fluid through the plurality of channels.

Implementations of the above embodiment may include one or more of the following features. The pump housing may include an inlet and an outlet coupled to the plurality of channels, and a narrowing portion disposed between the inlet and the outlet. The plurality of flexible vanes may be configured to compress when contacting the narrowing portion. The flexible rotor may include an elastomer and a thermoplastic polymer. The flexible rotor may be rotatable about a rotation axis perpendicular to a plane defined by the cassette housing. The pump housing may include a drive shaft and a gasket disposed about the drive shaft. The gasket may be configured to fluidly seal the pump housing. Each valve of the plurality of valves may be a pinch valve having an undulating shape with a deflectable portion. The cassette interface may include a plurality of actuators configured to push on the deflectable portion. The cassette housing may further include one or more sensors disposed in fluid contact with the plurality of channels. The one or more sensors may include one of a pressure sensor, a temperature sensor, a conductivity sensor, or an air bubble detector.

BRIEF DESCRIPTION OF THE DRAWINGS

Embodiments of the present disclosure are described herein with reference to the accompanying drawings, wherein.

DETAILED DESCRIPTION

Figure 1:
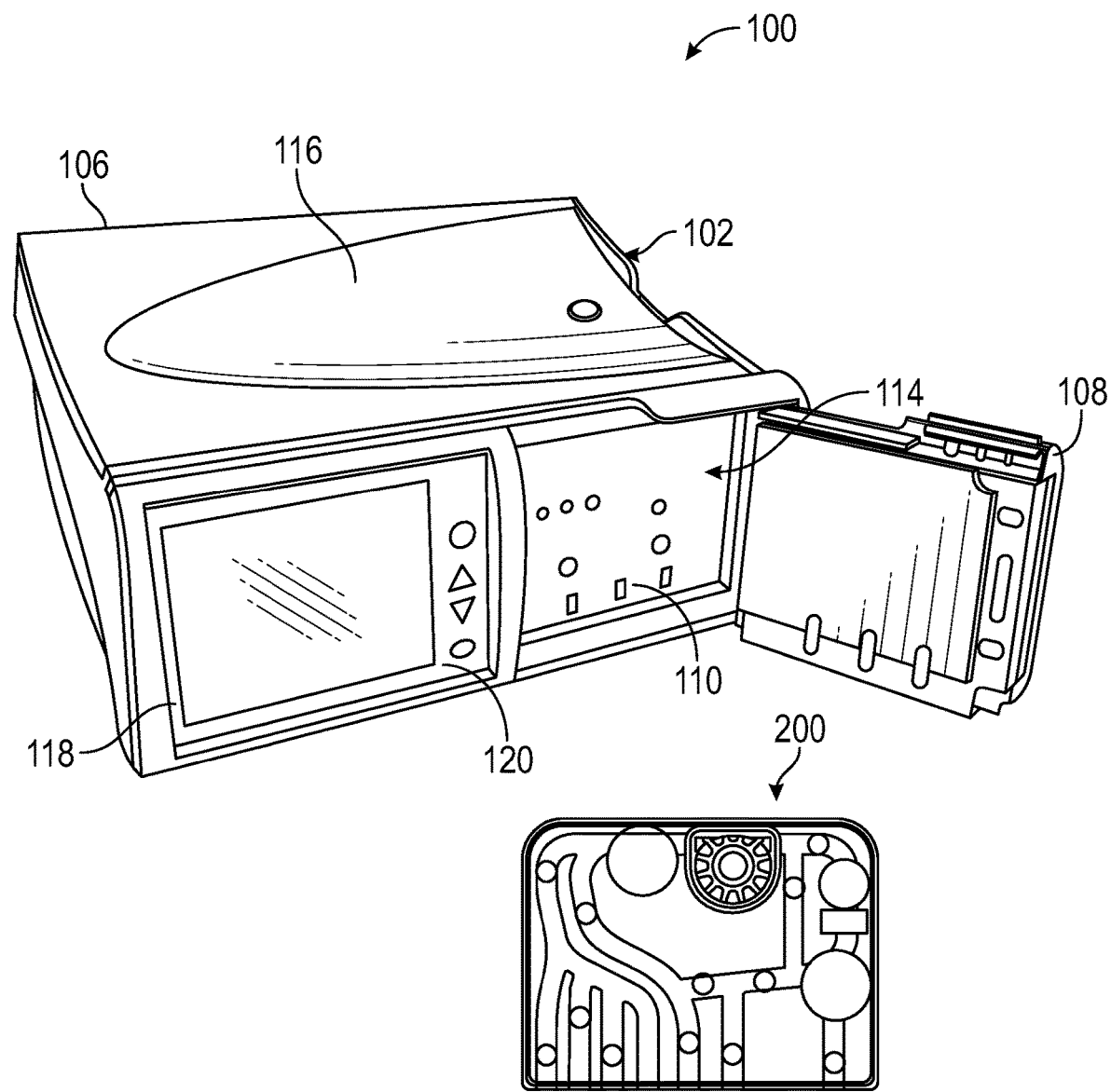
FIG. 1 is a perspective view of a peritoneal dialysis (PD) system including a PD cycler and a PD fluid cassette according to an embodiment the present disclosure.

With reference to FIG. 1, a peritoneal dialysis (PD) system 100 includes a PD cycler 102 and a PD fluid cassette 200. The PD cycler 102 and the PD cassette 200 are used to provide continuous cycler-assisted peritoneal dialysis. The PD cycler 102 may be used in a home environment. Due to its size and weight, the PD cycler 102 may be supported on a cart 104 that is used to improve ease of handling and storage of the PD cycler 102. The PD cycler 102 includes a housing 106, a door 108, and a cassette interface 110 that abuts an inner portion 202 the PD cassette 200 when the PD cassette 200 is disposed within a cassette compartment 114 formed between the cassette interface 110 and the closed door 108. A heater tray 116 may be positioned on top of the housing 106. The heater tray 116 is sized and shaped to accommodate a bag of dialysis solution (e.g., a 5 liter bag of dialysis solution). The PD cycler 102 also includes a display screen 118 and control buttons 120. In embodiments, the display screen 118 may be a touchscreen. The display screen 118 and control buttons 120 may be operated by a user (e.g., a patient) to allow, for example, set-up, initiation, and/or termination of a PD treatment.

Figure 2:
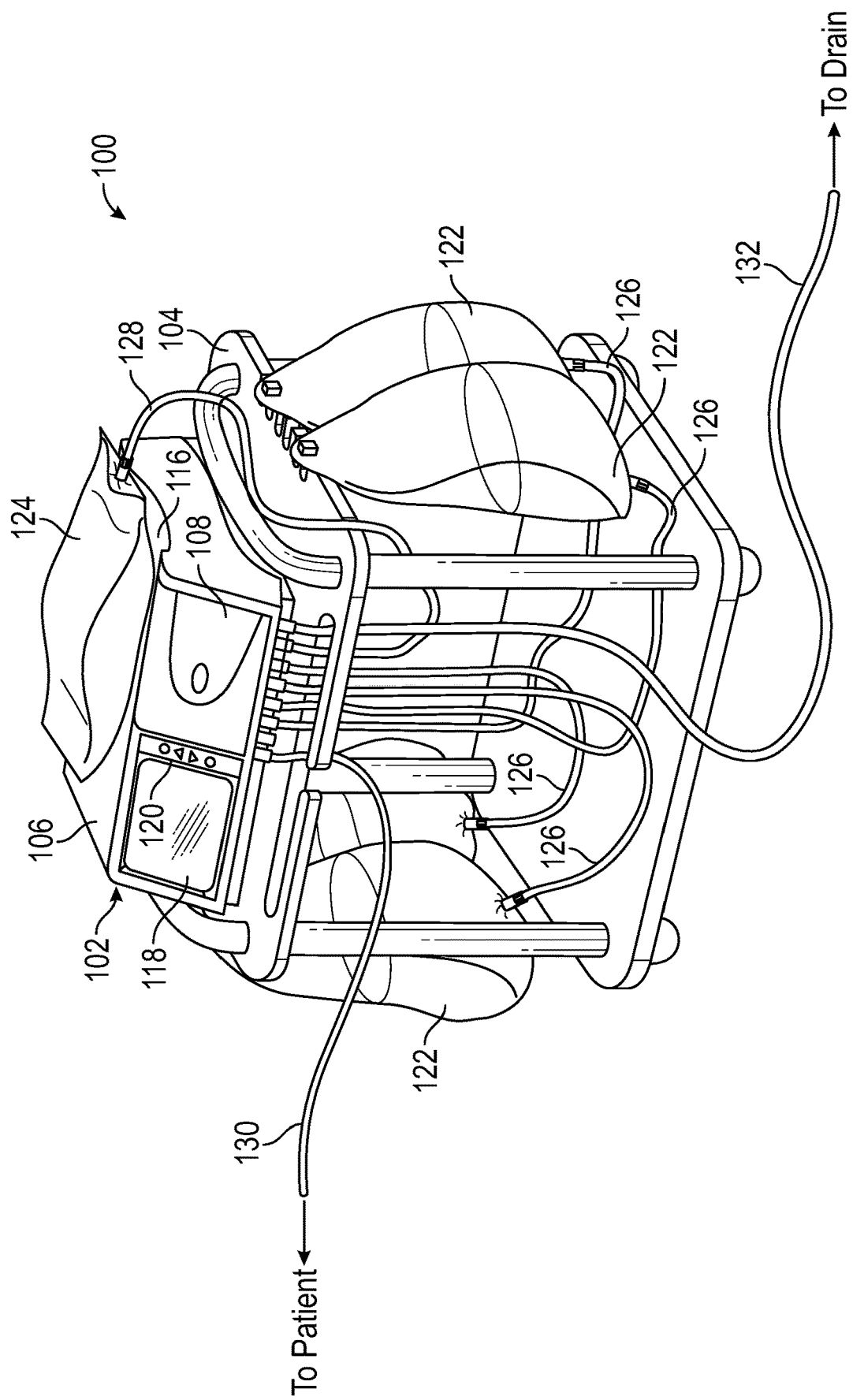
FIG. 2 is a perspective view of the PD cycler of FIG. 1.

Dialysis solution storage bags 122 may be suspended from the sides of the cart 104, and a dialysis solution fill bag 124 is positioned on the heater tray 116, as shown in FIG. 2. The storage bags 122 and the fill bag 124 are connected to the PD cassette 200 via storage bag lines 126 and a fill bag line 128, respectively. The storage bag lines 126 may be used to pass dialysis solution from storage bags 122 to the PD cassette 200 during use, and the fill bag line 128 may be used to pass dialysis solution back and forth between the PD cassette 200 and the fill bag 124 during use. In addition, a patient line 130 and a drain line 132 are connected to the PD cassette 200. The patient line 130 may be connected to a patient's abdomen via a catheter and may be used to pass dialysis solution back and forth between the PD cassette 200 and the patient during use. The drain line 132 may be connected to a drain or drain receptacle and may be used to pass dialysis solution from the PD cassette 200 to the drain or drain receptacle during use.

Figure 3:
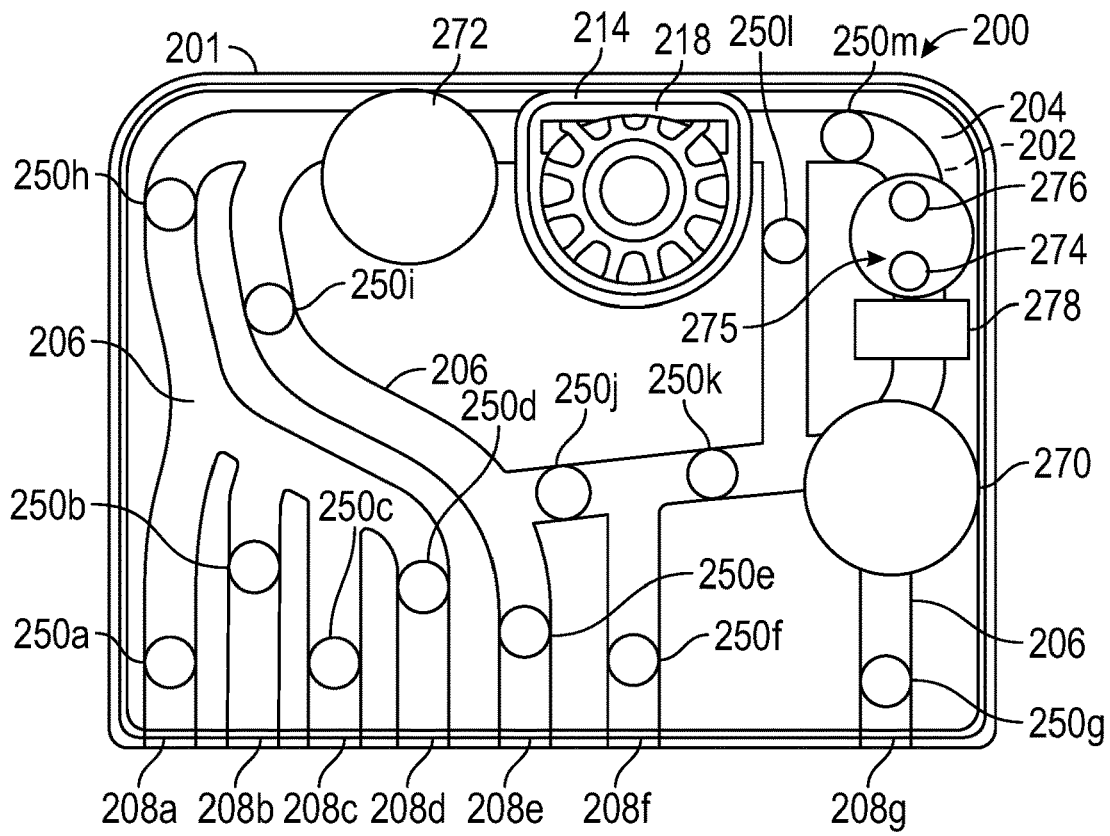
FIG. 3 is a partially exposed, plan view of an inner portion of the PD cassette of the PD system of FIG. 1.
Figure 4:
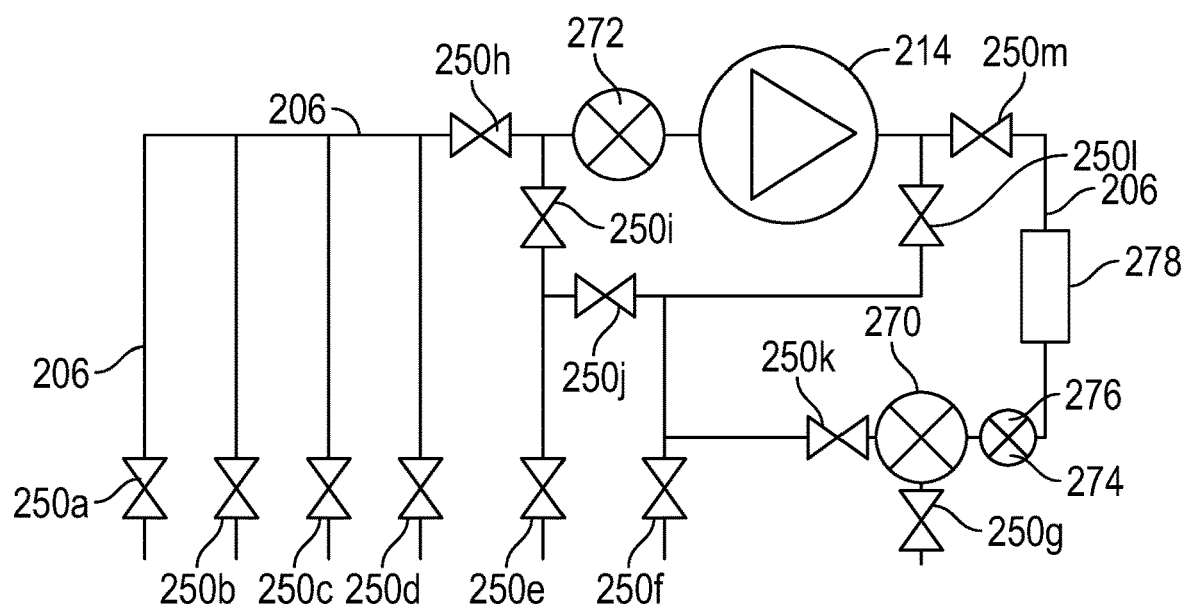
FIG. 4 is a schematic piping and instrumentation diagram of the PD cassette of FIG. 3.
Figure 5:
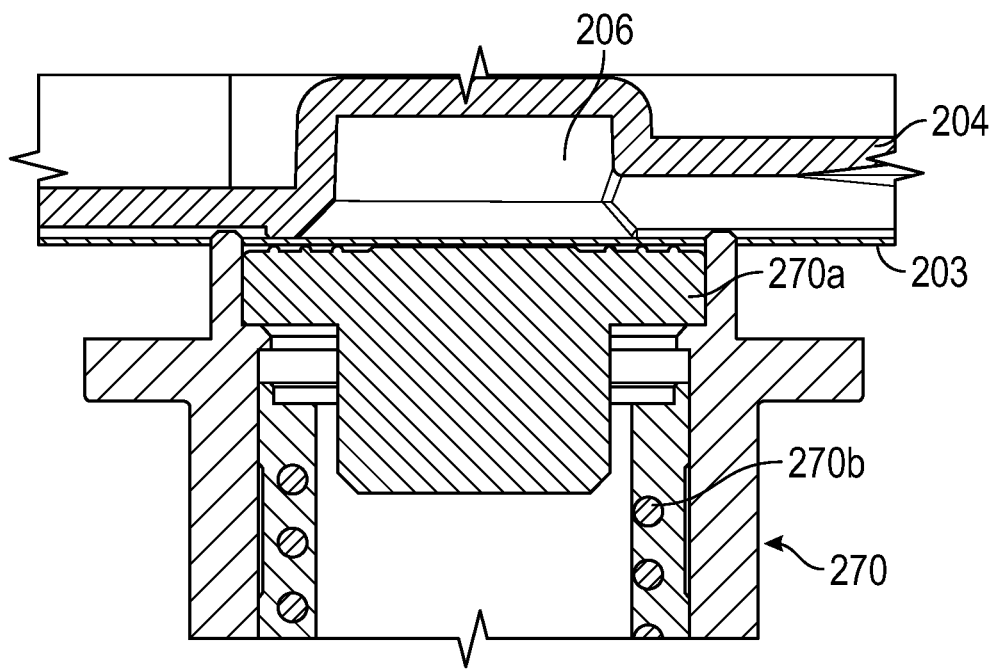
FIG. 5 is a cross-sectional view of a pressure sensor of the PD cassette of FIG. 3 in an open configuration according to an embodiment the present disclosure.

Referring to FIGS. 3 and 4, the PD cassette 200 includes a cassette housing 201 formed from an inner portion 202 and an outer portion 204. The entirety or a segment of the inner portion 202 may be formed from single or multiple layer flexible membrane 203 (FIG. 5). In embodiments, the flexible membrane 203 may be formed from polyvinyl chloride, polypropylene, silicone rubber, ethylene propylene diene monomer rubber, and the like. The inner portion 202 contacts the cassette interface 110 once the PD cassette 200 is loaded into the cassette compartment 114 of the PD cycler 102. The outer portion 204 may be formed from a rigid material and contacts the door 108 once the PD cassette 200 is loaded into the cassette compartment 114 of the PD cycler 102. The outer portion 204 may be formed from a thermoplastic polyester including, but not limited to, polyethylene terephthalate glycol, high-density polyethylene, polyvinyl chloride, polyethylene terephthalate glycol, and combinations thereof. The outer portion 204 may be transparent. The outer portion 204 defines a plurality of fluid channels 206, which are fluidly coupled to a plurality of fluid line connectors 208a, 208b, 208c, which act as inlet/output ports of the PD cassette 200.

The fluid channels 206 are fluidly coupled to a plurality of sensor portions, which may be larger than the fluid channels 206 and may be of various shapes (e.g., cylindrical, circular, etc.) to accommodate sensors within the PD cassette 200. As shown in FIGS. 3 and 4, the PD cassette 200 includes a plurality of sensors, namely, a first pressure sensor 270, a second pressure sensor 272, a temperature sensor 274, a conductivity sensor 276, and an air bubble detector 278.

These sensors are used to monitor pressure, temperature, conductivity, and presence of air bubbles in the dialysis fluid, respectively.

With reference to FIG. 5, pressure sensors 270 and 272 may be pressure transducers. Only the pressure sensor 270 is shown for simplicity. The pressure sensor 270 includes a contact pad 270a biased by a spring 270b and coupled to a pressure transducer. The contact pad 270a is in physical contact with the flexible membrane 203 and as the membrane 203 is deflected due to increased pressure of the dialysate flowing through the channel 206, the contact pad 270a is pushed away, thereby acting on the pressure transducer, which measures the pressure within the fluid channel 206.

Figure 6:
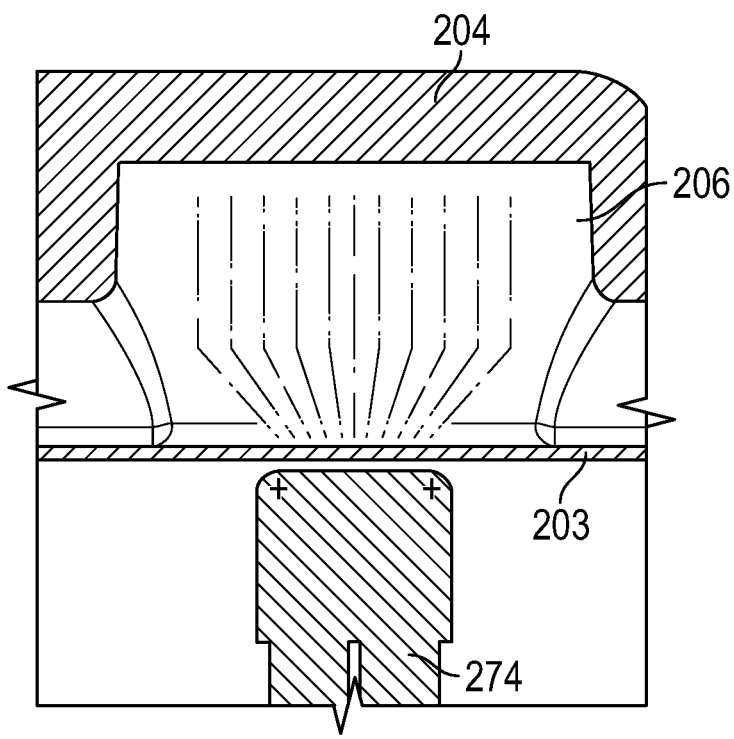
FIG. 6 is a cross-sectional view of a temperature sensor of the PD cassette of FIG. 3 in an open configuration according to an embodiment the present disclosure.

The temperature sensor 274 and the conductivity sensor 276 may be disposed in a single compartment 275. Conductivity sensor 276 may include two pairs of electrodes and is configured to determine conductivity by applying an electric current to a first pair of electrodes, while measuring the current through a second pair of electrodes. Conductivity is calculated based on measured current using the distance, surface area, and resistance of the electrodes. Temperature sensor 274 may be a thermocouple, a contactless infrared ("IR") sensor, or any other suitable temperature sensor. With reference to FIG. 6, the temperature sensor 274 is shown as an IR sensor, which includes an emitter configured to emit IR light and a receiver configured to measure reflected IR light and measure the temperature through the membrane 203. The a portion or the entirety of the membrane 203 is transparent to IR light such that the temperature sensor 274 can irradiate the dialysate through the membrane 203.

The air bubble detector 278 may be an acoustic and/or an optical bubble detector and is configured to detect the presence of air bubbles in the fluid based on disruption in the acoustic and/or optical signals transmitted through the fluid.

Figure 7:
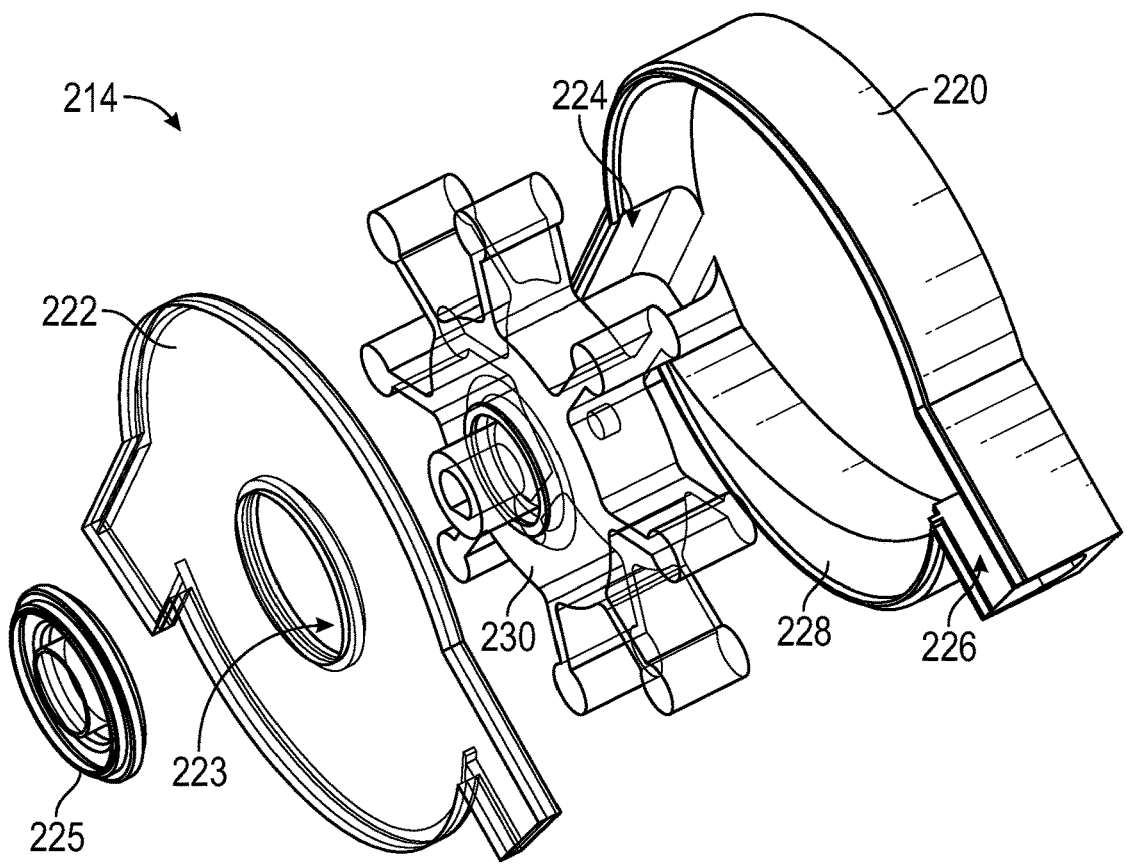
FIG. 7 is an exploded, perspective view of a pump assembly of the PD cassette of FIG. 3 according to an embodiment the present disclosure.

The PD cassette 200 includes a plurality of valves 250a-m disposed within fluid channels 206, which direct dialysis solution through the PD cassette 200. The PD cassette 200 also includes an integrated pump assembly 214 having a pump housing 218, which consists of a first pump housing portion 220 integrally formed as part of the outer portion 204 and a second pump housing portion 222 extending from the inner portion 202 (FIG. 7). During operation, the dialysis solution flows through the pump assembly 214 and the flow depends on the speed and direction of the pump assembly 214 as well as the state of the valves 250a-m.

Fluid line connectors 208a-g are positioned along the bottom edge of the PD cassette 200. As noted above, the fluid channels 206 in the PD cassette 200 lead from the pump assembly 214 to the connectors 208a-g. The PD cassette 200 is configured to move the dialysis solution between the fill bag 124 and one or more of the storage bags 122. The connectors 208a-g are configured to receive fittings of storage bag lines 126, the fill bag line 128, the patient line 130, and the drain line 132. In particular, storage bag lines 126 are connected to the connectors 208a-d, the fill bag line 128 is connected to the connector 208e, the patient line 130 is connected to the connector 208f, and the drain line 132 is connected to the connector 208g. Flow through each of the connectors 208a-g is controlled by a corresponding valve 250a-g. The PD cassette 200 also includes a plurality of valves 250h-m disposed in the plurality of channels 206 disposed therein.

With reference to FIG. 7-10, the pump assembly 214 includes the pump housing 218, which is formed from the first and second pump housing portions 220 and 222. The pump housing 218 is fluidly sealed by coupling the pump housing portions 220 and 222 using adhesive, welding, or using any other suitable methods. In embodiments, the pump housing 218 may be formed as a single component unit via molding. The pump housing 218 also includes a first connection 224 (e.g., inlet) and a second connection 226 (e.g., outlet) formed by the first and second pump housing portions 220 and 222. The pump assembly 214 may be operated in unidirectional or bidirectional manner such that the first connection 224 is the outlet and the second connection 226 is the inlet. Each of the first and second connections 224 and 226 are coupled to the fluid channels 206 to allow for movement of fluid therethrough by the pump assembly 214.

Figure 9:
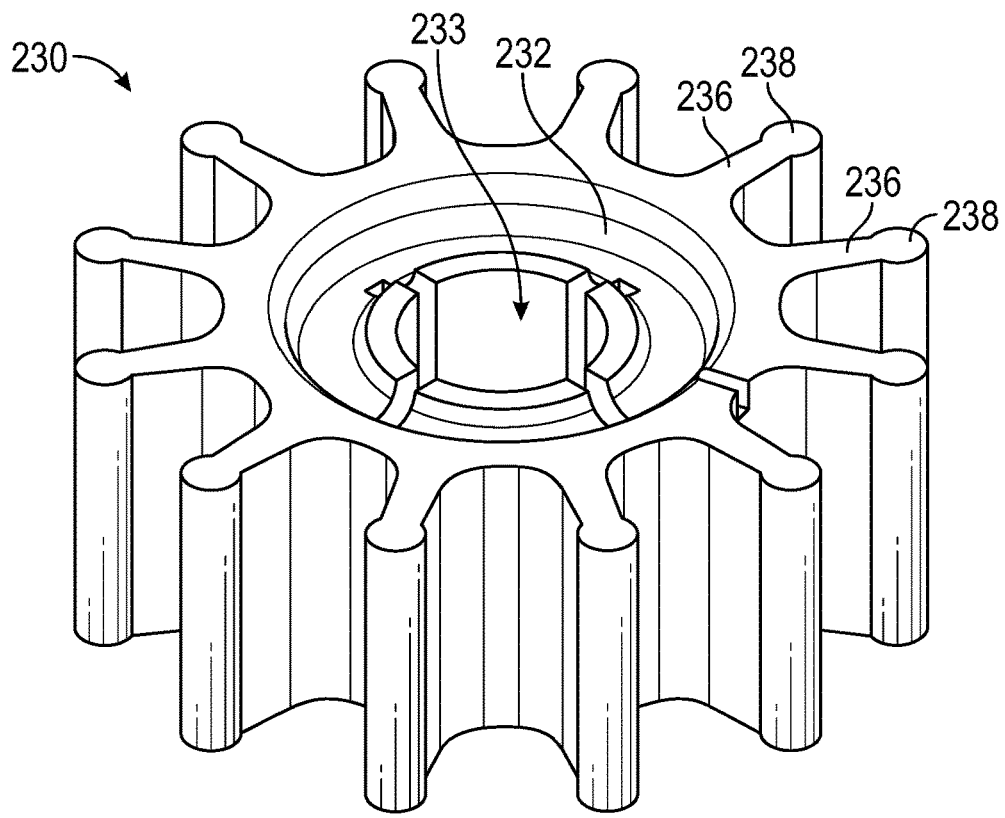
FIG. 9 is a perspective view of a rotor of the pump assembly of FIG. 5 according to an embodiment the present disclosure.

The pump assembly 214 also includes a flexible rotor 230. With reference to FIG. 9, the flexible rotor 230 includes a central shaft 232 with a plurality of vanes 236 extending radially from the shaft 232. Each of the vanes 236 terminates in a projection 238, which may have a cylindrical shape whose longitudinal axis is perpendicular to a radial axis defined by each of the vanes 236. The flexible rotor 230 may have any number of vanes 236, which for example may be from 3 to 15. The distance between the vanes 236, i.e., a straight line between neighboring projections 238, may be equal to the width or diameter of each of the first and second connections 224 and 226.

The vanes 236 have substantially the same width as the inner width of the pump housing 218, such that the vanes 236 contact the inner portion of the pump housing 218. The flexible rotor 230 may be formed from any suitable flexible polymeric material and may be formed by co-molding an elastomer, such as silicone rubber, and a thermoplastic polymer, including, but not limited to, polyoxymethylenes, polyurethanes, polycarbonate resins, polyamides, polyphenylene sulfides, acrylonitrile butadiene styrene resins, polyether ether ketones, polyphenylene oxides, polypropylenes, and combinations thereof.

Figure 8:
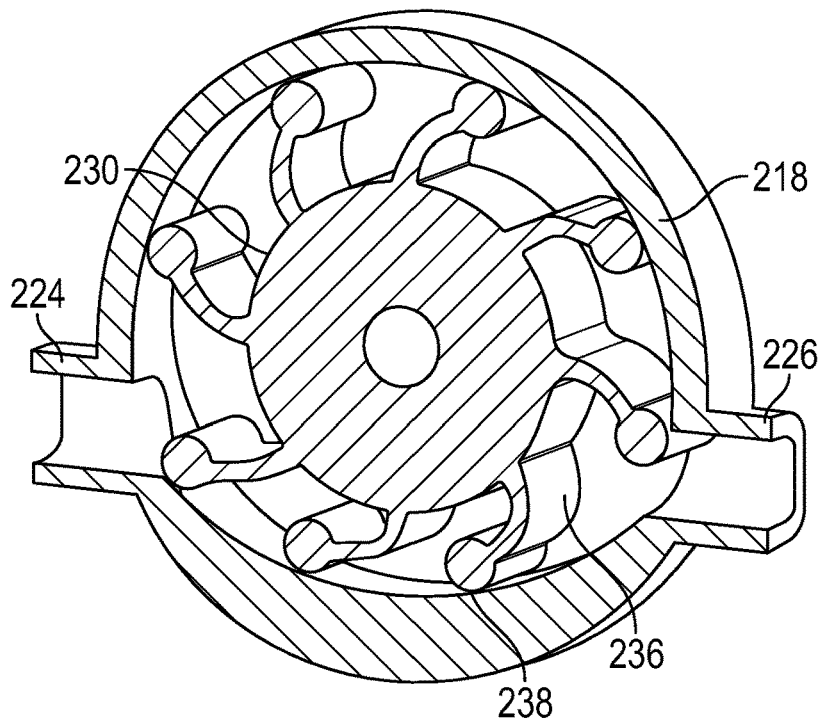
FIG. 8 is a cross-sectional view of the pump assembly of FIG. 5.

With reference to FIGS. 7 and 8, the pump housing 218 has a substantially circular planar cross-section. The pump housing 218 also includes a radial narrowing portion 228, which reduces the radius of the pump housing 218. The flexible rotor 230 is rotated about a rotation axis that is perpendicular to a plane defined by the cassette housing 201, i.e., the plane between the inner portion 202 and the outer portion 204. As used herein, the terms "parallel" and "perpendicular" include relative configurations that are substantially parallel and substantially perpendicular up to about + or −10 degrees from true parallel and true perpendicular. As the flexible rotor 230 is rotated within the pump housing 218, the vanes 236 are compressed as shown in FIG. 8. The narrowing portion 228 is disposed between the first and second connections 224 and 226 and may be arcuately-shaped with a larger radius than the radius of the pump housing 218 with the center of the narrowing portion 228 being offset from the center of the pump housing 218.

Figure 10:
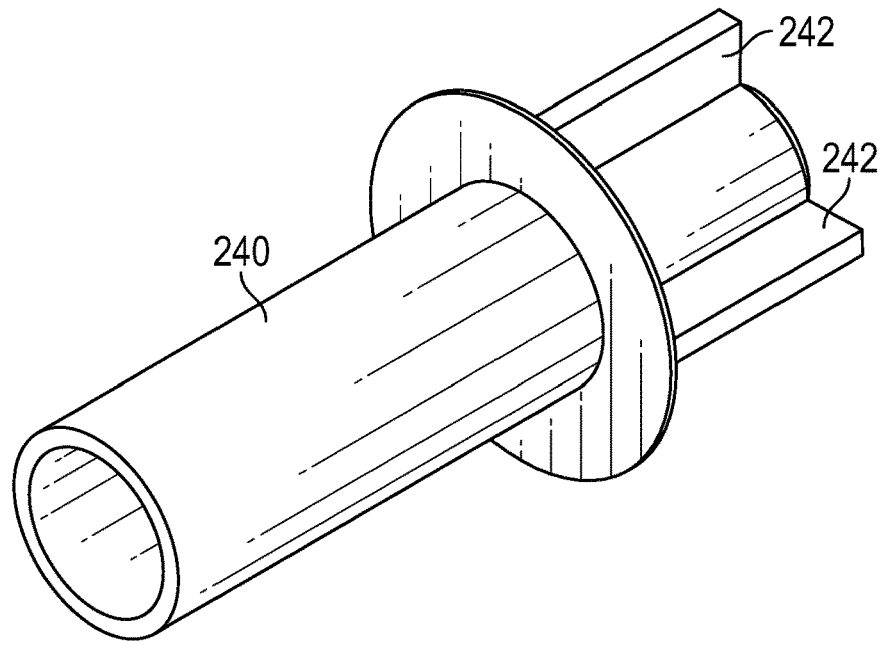
FIG. 10 is a perspective view of a drive shaft for rotating the rotor of FIG. 7.

The second pump housing portion 222 defines an opening 223 for coupling the rotor 230 to the cassette interface 110. With reference to FIG. 10, the pump assembly 214 includes a drive shaft 240 configured to couple to and be rotatable by a motor (not shown). The drive shaft 240 includes a plurality of fins 242 configured to engage a corresponding opening 233 within the central shaft 232 of the flexible rotor 230. The drive shaft 240 is inserted through the opening 223. A gasket 225 covers the opening 223 and forms a fluid-tight seal between the flexible rotor 230 and the drive shaft 240 passing through an opening in the gasket 225. The gasket 225 may be formed from a polymeric flexible material, which may be formed by co-molding an elastomer, such as silicone rubber, and a thermoplastic polymer, such as, polyester, polyethylene terephthalate glycol, high-density polyethylene, and combinations thereof.

Figure 11A:
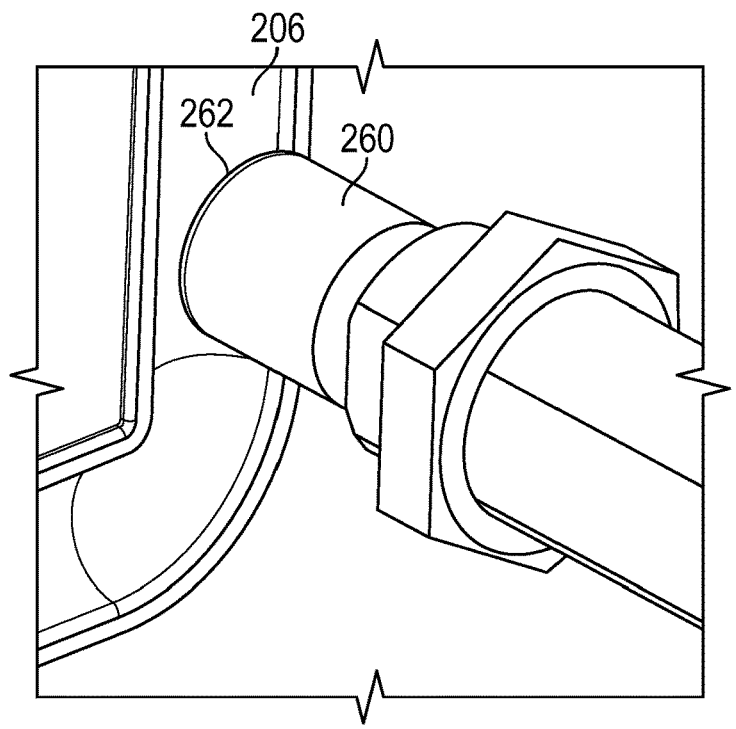
FIG. 11A is a perspective view of a pinch valve of the PD cassette of FIG. 3 in an open configuration according to an embodiment the present disclosure.
Figure 11B:
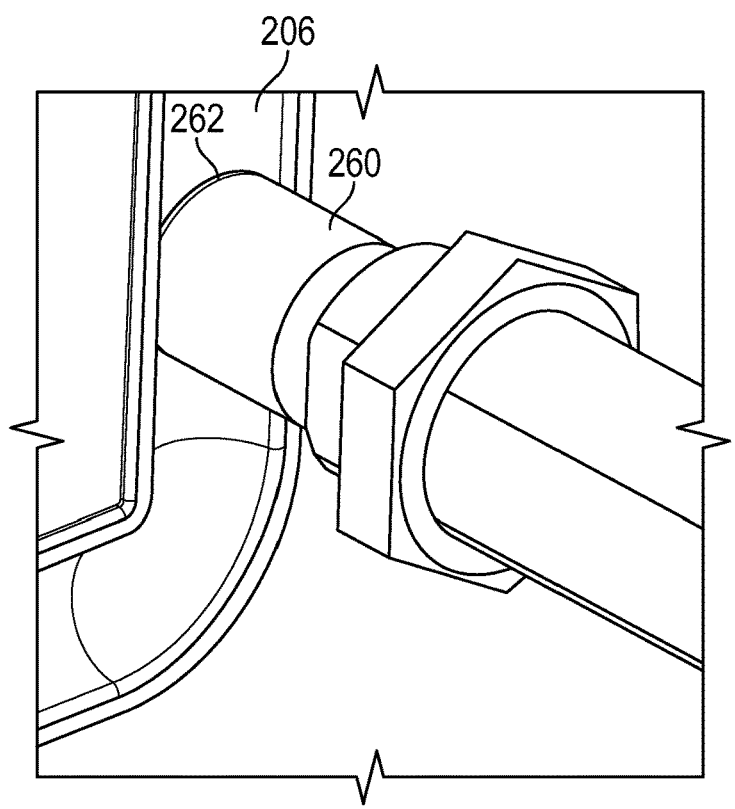
FIG. 11B is a perspective view of the pinch valve of the PD cassette of FIG. 3 in a closed configuration according to an embodiment the present disclosure.
Figure 12A:
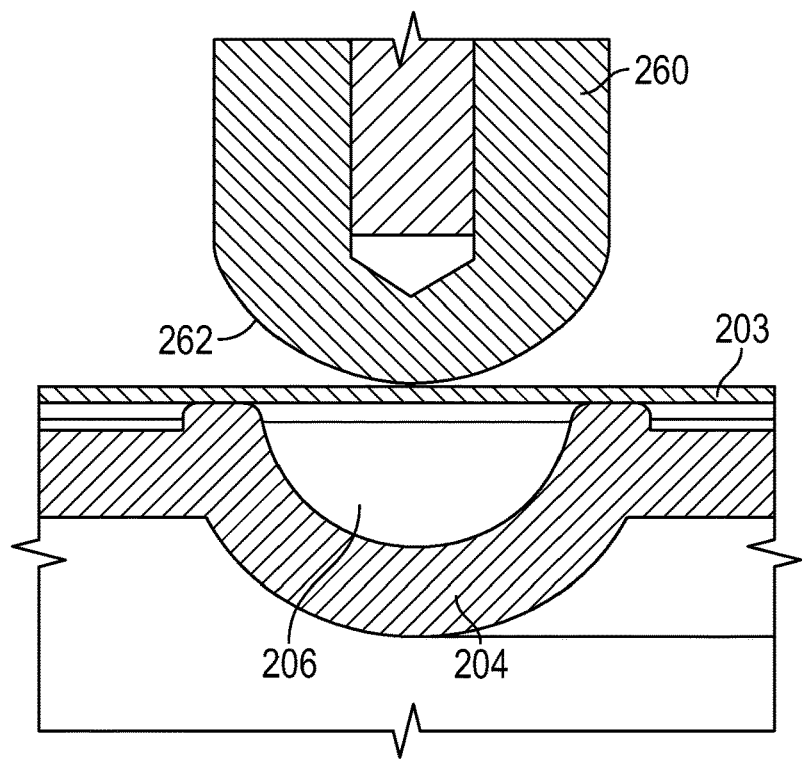
FIG. 12A is a cross-sectional view of the pinch valve of the PD cassette of FIG. 3 in an open configuration according to an embodiment the present disclosure.
Figure 12B:
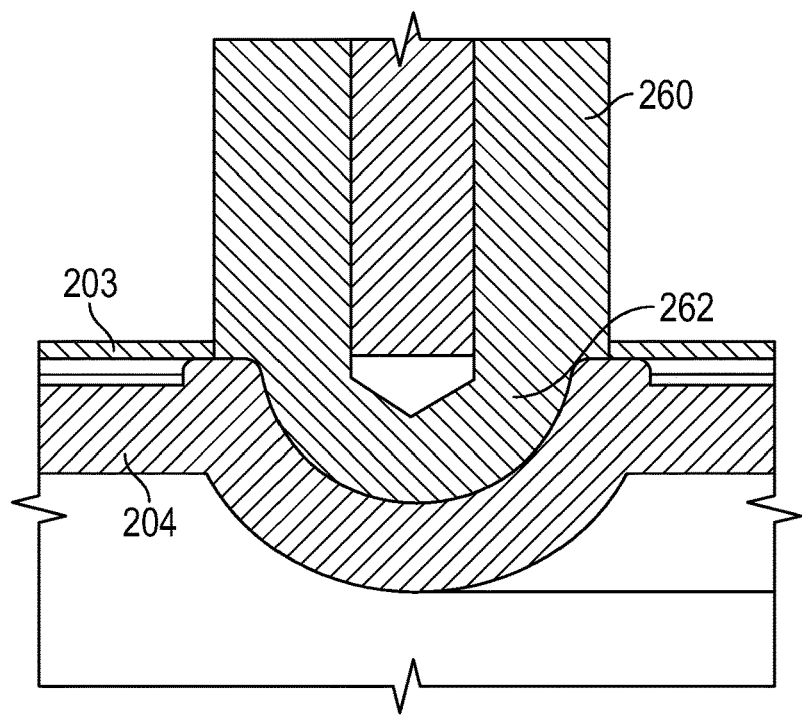
FIG. 12B is a cross-sectional view of the pinch valve of the PD cassette of FIG. 3 in a closed configuration according to an embodiment the present disclosure.

With reference to FIGS. 11A-B and 12A-B, one of the valves 250a-m is shown as a valve 250, which may be a pinch valve formed from the membrane 203 that is compressed by an actuator 260. The valve 250 is disposed within the fluid channel 206 and a bottom surface of the valve 250 abuts the flexible membrane 203. The actuator 260 includes a tip 262 formed from a conformable material and is shaped to fit within the channel 206. The actuator 260 is disposed within the cassette interface 110 and is movable along a longitudinal axis that is transverse to a plane defined by the PD cassette 200, thereby pushing the membrane 203 into the channel 206 blocking the channel 206. The actuator 260 may be a spring-loaded pneumatic or solenoid actuator. With reference to FIGS. 11A and 12A, the valve 250 is shown in an open configuration, in which the actuator 260 is withdrawn and may contact the membrane 203 without impinging on the membrane 203, keeping the channel 206 open. As shown in FIGS. 11B and 12B, the valve 250 is shown in a closed configuration, in which the actuator 260 is advanced longitudinally and compresses the membrane 203 into the channel 206, thereby blocking the channel 206. Thus, the flow of dialysis solution through the PD cassette 200 is controlled using selective depression of the portions of the membrane 203 by selectively activating the actuators 260 and rotating the rotor 230 in either direction, i.e., clockwise or counterclockwise, at a selected rate of rotation.

Figure 13:
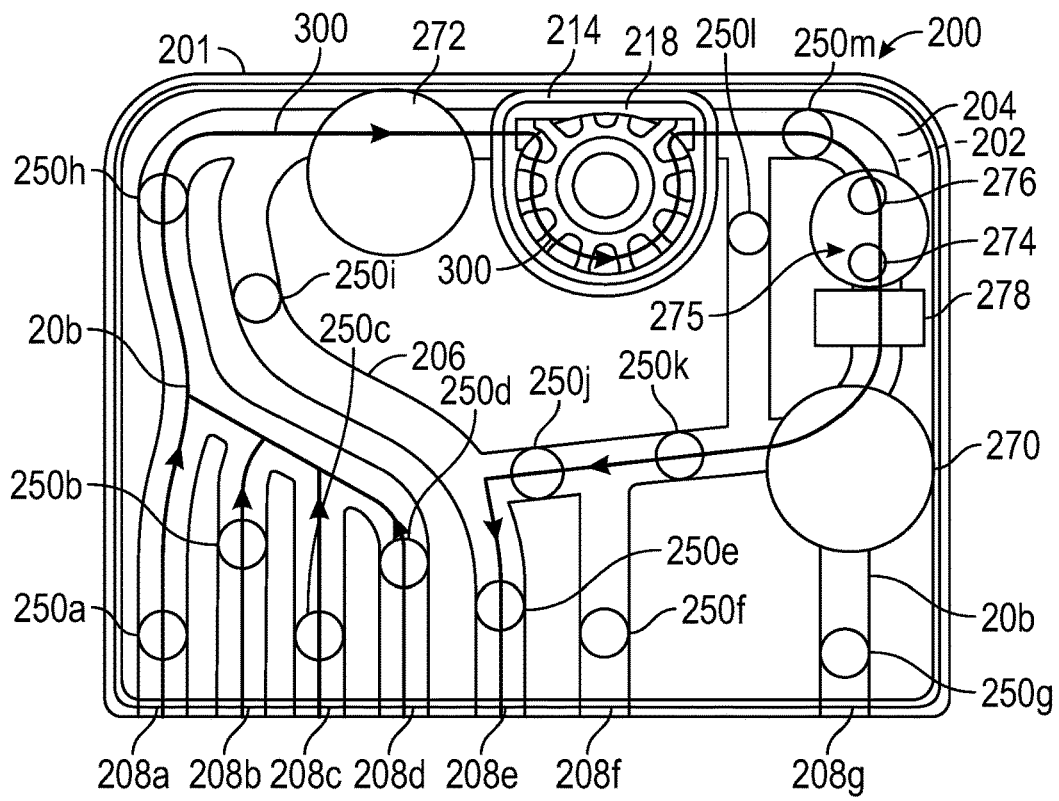
FIG. 13 is a plan view of the PD cassette of FIG. 3 in a bag filling configuration according to an embodiment the present disclosure.

With reference to FIG. 13, the PD cassette 200 is in a filling configuration, in which the fill bag 124 is filled with the dialysis solution from one or more of the storage bags 122. The flow of the dialysis solution is shown by an arrow 300. The valves 250a-e are open, with the valves 250a-d opening the connectors 208a-d to the storage bags 122 and the valve 250e opening the connector 208e to the fill bag 124. In addition, valves 250h, j, k, and m are also open, with the remaining valves being closed, and the pump assembly 214 is operated in the first direction, which transfers the fluid from the storage bags 122 to the fill bag 124.

Figure 14:
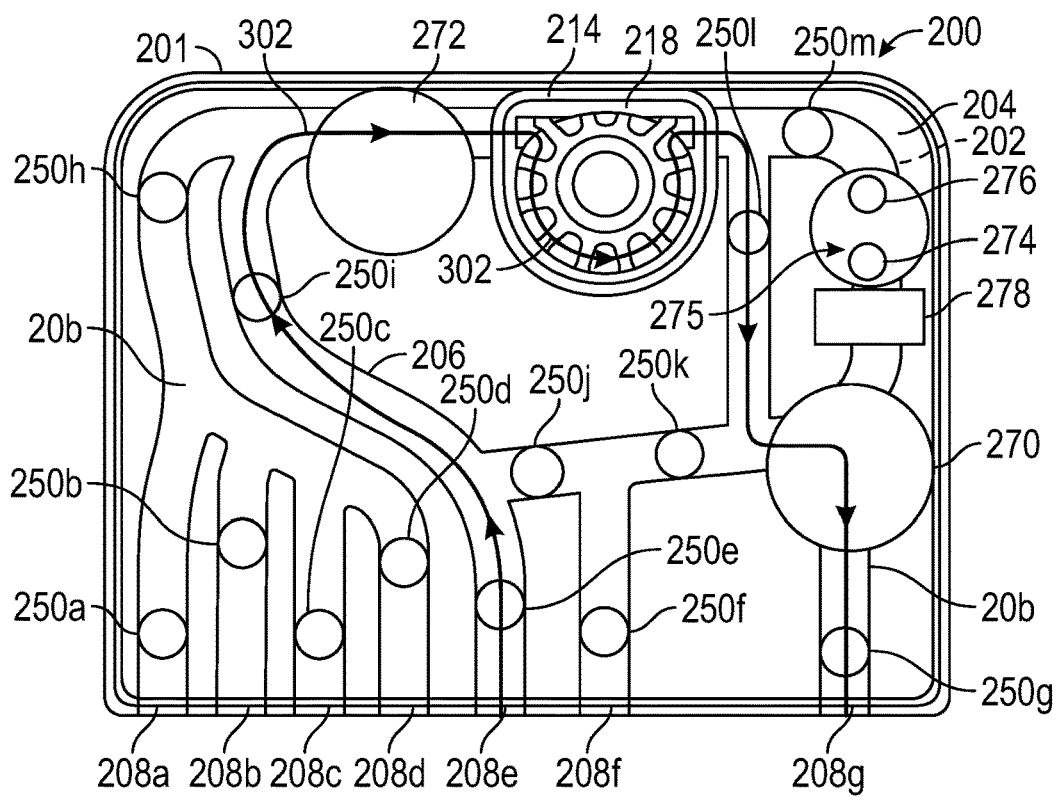
FIG. 14 is a plan view of the PD cassette of FIG. 3 in a first priming configuration according to an embodiment the present disclosure.

With reference to FIG. 14, the PD cassette 200 is in a first priming configuration for priming a first portion of the channels 206 from the fill bag 124. The flow of the dialysis solution is shown by an arrow 302. The valves 250e, g, i, and l are open and the pump assembly 214 is operated in a first direction such that dialysis solution from the fill bag line 128 connected to the connector 208e flows to the connector 208g and to the drain line 132. In this configuration, the fluid channels 206 interconnecting the connectors 208e and 208g are primed.

Figure 15:
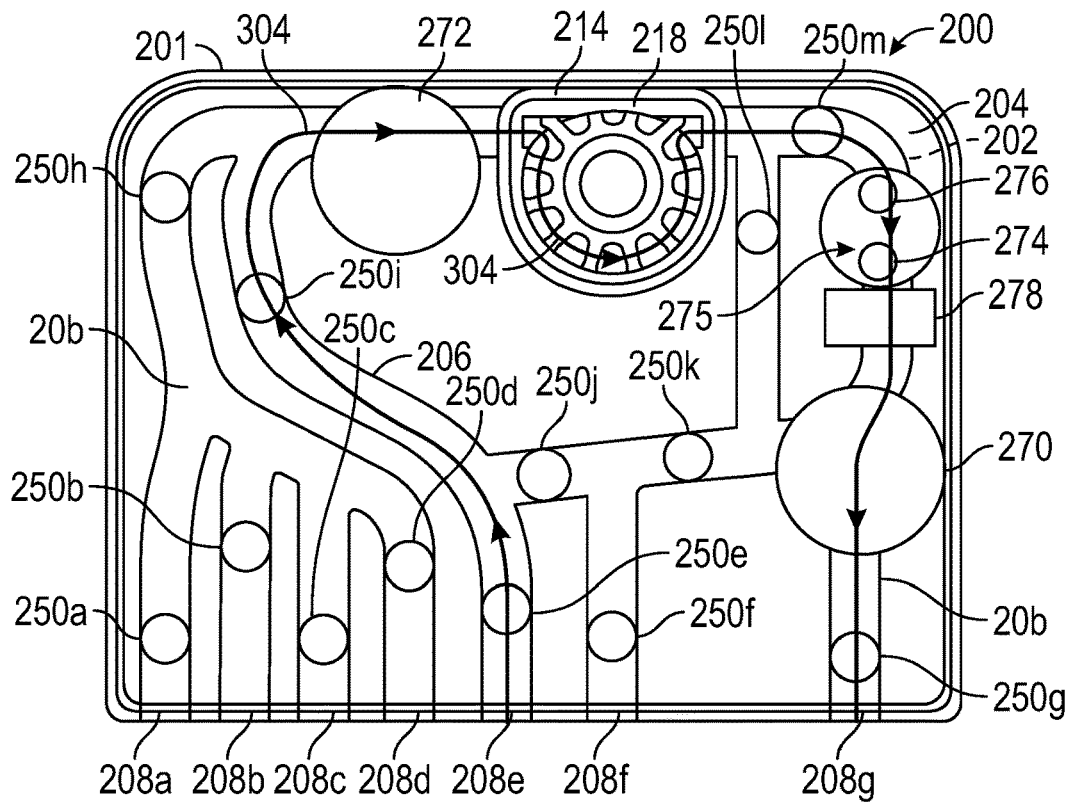
FIG. 15 is a plan view of the PD cassette of FIG. 3 in a second priming configuration according to an embodiment the present disclosure.

With reference to FIG. 15, the PD cassette 200 is in a second priming configuration for priming a second portion the channels 206 from the fill bag 124. The flow of the dialysis solution is shown by an arrow 304. The valves 250e, i, g, and m are open, with the remaining valves being closed, and the pump assembly 214 is operated in a first direction such that dialysis solution from the fill bag line 128 connected to the connector 208e flows to the connector 208g and to the drain line 132. In this configuration, the fluid channel 206 interconnecting the connectors 208e and 208g are primed.

Figure 16:
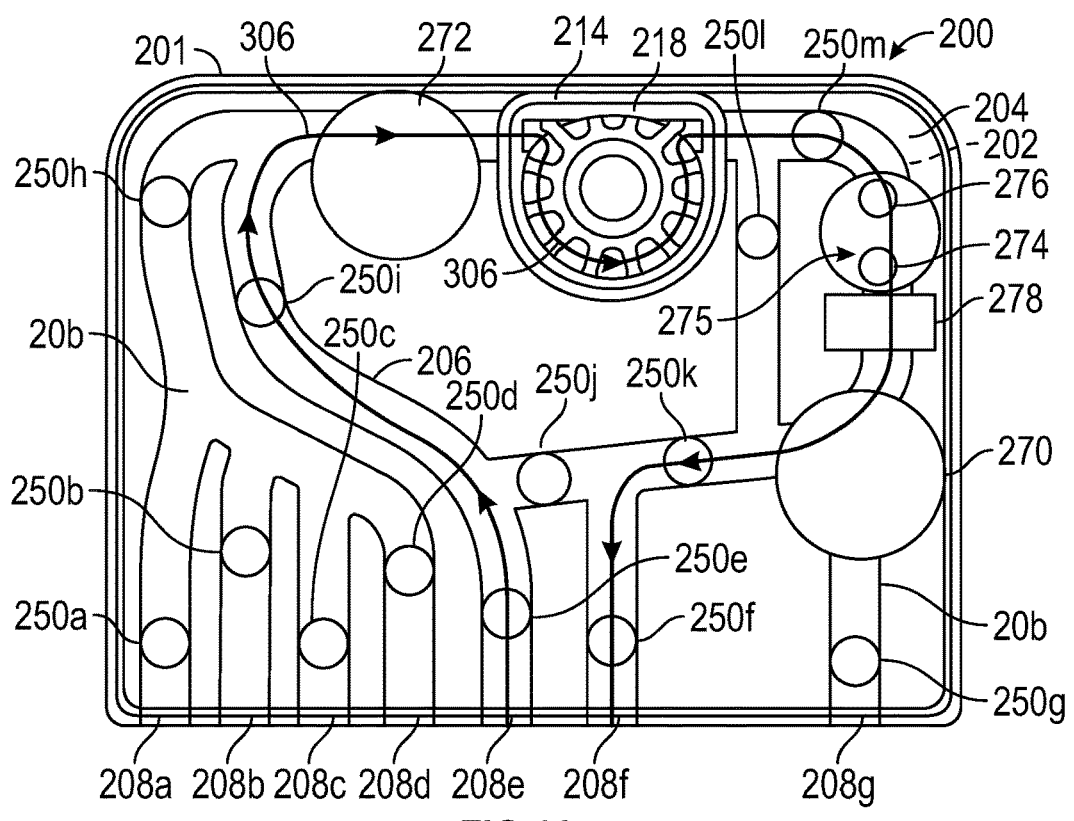
FIG. 16 is a plan view of the PD cassette of FIG. 3 in a patient filling configuration according to an embodiment the present disclosure.

With reference to FIG. 16, the PD cassette 200 is shown in a patient filling configuration, in which the valves 250e, f, i, m, and k are open, with the remaining valves being closed, and the pump assembly 214 is operated in the first direction to move the fluid to the patient line 130. The flow of the dialysis solution is shown by an arrow 306. In this configuration, the dialysis solution from the fill bag line 128 connected to the connector 208e flows to the connector 208f and to the patient line 130 to allow for the dialysis solution to be infused into the patient.

Figure 17:
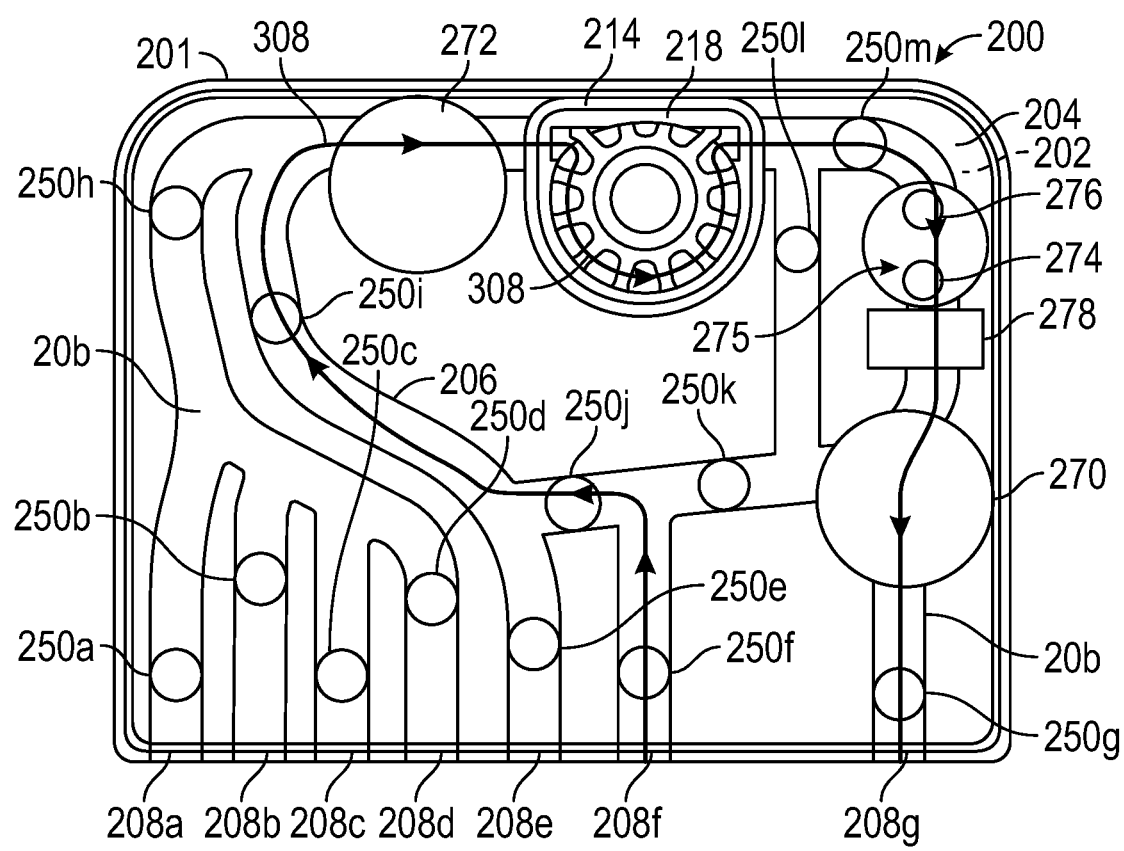
FIG. 17 is a plan view of the PD cassette of FIG. 3 in a patient draining configuration according to an embodiment the present disclosure.

FIG. 17 shows the PD cassette 200 in a drain configuration, in which the dialysis solution is removed from the patient after the infusion is completed and the dialysis solution has dwelled in the patient for the duration of the treatment time. The valves 250f, g, i, j, and m, are open. The flow of the dialysis solution is shown by an arrow 308. The pump assembly 214 is operated in the first direction such that the dialysis solution is drained from the patient. In this configuration, the fluid is withdrawn from the patient through the patient line 130 connected to the connector 208f and to the connector 208g coupled to the drain line 132.

While the present disclosure describes various embodiments of the PD cassette, the PD cassettes may be modified for use with other blood treatment apparatuses, such as hemodialysis systems. It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

What is claimed is:

1. A dialysis cassette comprising:
  a cassette housing including:
    an outer portion defining a perimeter of the cassette housing;
    a plurality of channels fluidly coupled to a plurality of connectors, wherein fluid flow to and from a patient is delivered through a single connector of the plurality of connectors; and
    a plurality of valves disposed within the plurality of channels; and
  a single pump assembly disposed within the outer portion of the cassette housing, the pump assembly including:
    a pump housing; and
    a flexible rotor having a plurality of flexible vanes, wherein the flexible rotor is rotatable in either a clockwise direction or a counterclockwise direction to move a fluid through the plurality of channels.

2. The dialysis cassette according to claim 1, wherein the flexible rotor is rotatable about a rotation axis perpendicular to a plane defined by the cassette housing.

3. The dialysis cassette according to claim 1, wherein the pump housing includes a drive shaft and a gasket disposed about the drive shaft, the gasket configured to fluidly seal the pump housing.

4. The dialysis cassette according to claim 3, wherein the drive shaft includes a plurality of fins configured to engage a corresponding opening on the pump housing.

5. The dialysis cassette according to claim 1, wherein each valve of the plurality of valves is a pinch valve having an undulating shape with a deflectable portion.

6. The dialysis cassette according to claim 1, wherein a width between a tip of each flexible vane of the plurality of flexible vanes and a tip from an adjacent flexible vane of the plurality of flexible vanes is substantially equal to a width of an inlet of the pump housing.

7. The dialysis cassette according to claim 1, wherein the flexible rotor is formed by co-molding an elastomer and a thermoplastic polymer.

8. The dialysis cassette according to claim 1, wherein the cassette housing includes:

a sensor compartment having both a temperature sensor and a conductivity sensor disposed therein.

9. The dialysis cassette according to claim 1, wherein the pump assembly includes a first portion and a second portion, wherein the first portion of the pump assembly is integrally formed with the outer portion of the cassette housing such that the pump assembly is contained within the outer portion of the cassette housing.

10. A dialysis system comprising:
a peritoneal dialysis cycler including:
   a cassette interface;
   a door having an open position and a closed position;
   a compartment formed between the cassette interface and the door when the door is in the closed position;
   a patient line;
   a drain line; and
   a fluid source; and
   a cassette configured to couple engage the cassette interface, the patient line, the drain line, and the fluid source when disposed within the compartment, the cassette including:
      a rigid outer portion defining a perimeter of the cassette;
      a plurality of channels fluidly coupled to a plurality of connectors each of which is coupled to a respective one of the patient line, the drain line, and the fluid source,
         wherein fluid flow to and from a patient is delivered through a single connector of the plurality of connectors;
      a plurality of valves disposed within the plurality of channels; and
      a pump assembly disposed within the rigid outer portion of the cassette housing, the pump assembly having:
         a pump housing; and
         a flexible rotor including a plurality of flexible vanes, wherein the flexible rotor is rotatable in either a clockwise direction or a counterclockwise direction to move a fluid through the plurality of channels.

11. The dialysis system according to claim 10, wherein the pump housing includes an inlet and an outlet coupled to the plurality of channels.

12. The dialysis system according to claim 11, wherein the pump housing includes a narrowing portion disposed between the inlet and the outlet.

13. The dialysis system according to claim 12, wherein the plurality of flexible vanes is configured to compress when contacting the narrowing portion.

14. The dialysis system according to claim 13, wherein the flexible rotor includes an elastomer and a thermoplastic polymer.

15. The dialysis system according to claim 10, wherein the flexible rotor is rotatable about a rotation axis perpendicular to a plane defined by the cassette housing.

16. The dialysis system according to claim 10, wherein the pump housing includes a drive shaft and a gasket disposed about the drive shaft, the gasket configured to fluidly seal the pump housing.

17. The dialysis system according to claim 10, wherein each valve of the plurality of valves is a pinch valve having an undulating shape with a deflectable portion.

18. The dialysis system according to claim 17, wherein the cassette interface includes a plurality of actuators configured to push on the deflectable portion.

19. The dialysis system according to claim 10, wherein the cassette housing further includes at least one sensor disposed in contact with the plurality of channels, the at least one sensor being one of a pressure sensor, a temperature sensor, a conductivity sensor, or an air bubble detector.

20. The dialysis system of claim 19, wherein the at least one sensor includes the conductivity sensor and the temperature sensor, wherein the conductivity sensor and the temperature sensor are disposed within a single sensor compartment in the cassette housing.

* * * * *